(12) United States Patent
Vick et al.

(10) Patent No.: US 8,959,277 B2
(45) Date of Patent: Feb. 17, 2015

(54) FACILITATING GATED STORES WITHOUT DATA BYPASS

(75) Inventors: Christopher A. Vick, San Jose, CA (US); Gregory M. Wright, Mountain View, CA (US); Mark S. Moir, Windham, NH (US)

(73) Assignee: Oracle America, Inc., Redwood Shores, CA (US)

( * ) Notice: Subject to any disclaimer, the term of this patent is extended or adjusted under 35 U.S.C. 154(b) by 581 days.

(21) Appl. No.: 12/334,316

(22) Filed: Dec. 12, 2008

(65) Prior Publication Data

US 2010/0153662 A1  Jun. 17, 2010

(51) Int. Cl.
G06F 12/00 (2006.01)
G06F 9/45 (2006.01)
G06F 9/38 (2006.01)
G06F 9/30 (2006.01)

(52) U.S. Cl.
CPC .............. *G06F 8/52* (2013.01); *G06F 9/3834* (2013.01); *G06F 9/384* (2013.01); *G06F 9/3863* (2013.01); *G06F 9/30087* (2013.01); *G06F 9/3857* (2013.01); *G06F 9/3004* (2013.01)
USPC .......................................................... 711/6

(58) Field of Classification Search
USPC .......................................................... 711/6
See application file for complete search history.

(56) References Cited

U.S. PATENT DOCUMENTS

| 3,736,566 | A | * | 5/1973 | Anderson et al. ............... 714/15 |
| 5,644,742 | A | * | 7/1997 | Shen et al. ..................... 712/244 |
| 5,649,136 | A | * | 7/1997 | Shen et al. ..................... 712/244 |
| 5,832,205 | A | * | 11/1998 | Kelly et al. ...................... 714/53 |
| 5,892,966 | A | * | 4/1999 | Petrick et al. .................. 712/36 |
| 7,600,097 | B1 | * | 10/2009 | Wright ........................... 712/216 |
| 7,870,350 | B1 | * | 1/2011 | Yu et al. ......................... 711/155 |
| 2005/0027965 | A1 | * | 2/2005 | Yamada et al. ................ 712/34 |
| 2005/0251666 | A1 | * | 11/2005 | Chaudhry et al. ............. 712/228 |

OTHER PUBLICATIONS

Smith, Jim et al., "Virtual Machines: Versatile Platforms for Systems and Processes", The Morgan Kaufmann Series in Computer Architecture and Design, ISBN 978-1558609105, Morgan Kaufmann; 1 edition (Jun. 3, 2005).

Ebcioglu, Kemal et al., "IBM Research Report Daisy: Dynamic Compilation for 100% Architectural Compatibility", RC 20538 (Aug. 5, 1996) Computer Science, T.J. Watson Research Center Yorktown Heights, New York.

Klaiber, Alexander et al., "The Technology Behind Crusoe Processors", Low-Power x86-Compatable Processors Implemented with Code Morphing Software, Transmeta Corporation, Jan. 2000.

* cited by examiner

*Primary Examiner* — Larry Mackall
(74) *Attorney, Agent, or Firm* — Park, Vaughan, Fleming & Dowler LLP; Mark Spiller

(57) ABSTRACT

One embodiment of the present invention provides a system that facilitates precise exception semantics for a virtual machine. During operation, the system executes a program in the virtual machine using a processor that includes a gated store buffer that stores values to be written to a memory. This gated store buffer is configured to delay a store to the memory until after a speculatively-optimized region of the program commits. The processor signals an exception when it detects that a load following the store is attempting to access the same memory region being written by the store prior to the commitment of the speculatively-optimized region.

20 Claims, 16 Drawing Sheets

FACILITATING GATED STORES WITHOUT DATA BYPASS

RELATED APPLICATION

The subject matter of this application is related to the subject matter in a co-pending non-provisional application by Christopher A. Vick and Gregory M. Wright that was filed on the same day as the instant application and is entitled "Using Safepoints to Provide Precise Exception Semantics for a Virtual Machine," having Ser. No. 12/334,290, and filing date of 12 Dec. 2008. The subject matter of this application is also related to the subject matter in a co-pending non-provisional application by Christopher A. Vick and Gregory M. Wright that was filed on the same day as the instant application and is entitled "Using Register Rename Maps to Facilitate Precise Exception Semantics," having Ser. No. 12/334,183, and filing date of 12 Dec. 2008.

BACKGROUND

1. Field of the Invention

The present invention generally relates to virtual machines. More specifically, the present invention relates to techniques that facilitate providing precise exception semantics for a virtual machine.

2. Related Art

Virtual machines can be used to emulate different hardware environments upon the physical hardware of a computing device. For instance, a virtual machine can facilitate executing programs that have been compiled for a different instruction set architecture (ISA) than that of the computing device. Moreover, two or more virtual machines that emulate different hardware environments and/or operating systems may co-exist and simultaneously execute guest programs on the same computing device.

A virtual machine that emulates an ISA needs to precisely emulate the system semantics of the ISA. More specifically, the virtual machine needs to ensure that each exception which is signaled for a guest program is delivered at the precise program counter and with precisely the same state as would occur on the original target hardware for the ISA. However, because the virtual machine is executing on a computing device that uses different instructions and has different system semantics than the emulated ISA, ensuring precise exceptions can be challenging. Software techniques for providing precise exception semantics are very slow and consequently have a negative impact on program performance. Alternatively, hardware techniques that provide such precise exception semantics typically improve performance over software techniques, but involve additional hardware complexity and cost.

Hence, what is needed are structures and methods that provide precise exception semantics for a virtual machine without the above-described problems.

SUMMARY

One embodiment of the present invention provides a system that facilitates precise exception semantics for a virtual machine. During operation, the system receives a program comprised of instructions that are specified in a machine instruction set architecture of the virtual machine, and translates these instructions into native instructions for the processor that the virtual machine is executing upon. While performing this translation, the system inserts one or more safepoints into the translated native instructions. The system then executes these native instructions on the processor. During execution, if the system detects that an exception was signaled by a native instruction, the system reverts the virtual machine to a previous safepoint to ensure that the virtual machine will precisely emulate the exception behavior of the virtual machine's instruction set architecture. The system uses a gated store buffer to ensure that any stores that occurred after the previous safepoint are discarded when reverting the virtual machine to the previous safepoint.

In some embodiments, the system provides precise exception semantics to ensure that the virtual machine precisely emulates the behavior and output of the instruction set architecture of the virtual machine. These precise exception semantics include ensuring that the exception is delivered at the precise virtual program counter and with the precise state expected by the instruction set architecture of the virtual machine.

In some embodiments, a safepoint includes a program counter that specifies a given instruction in the program and a state mapping that describes how to recover the precise state for the program counter while executing the program.

In some embodiments, after reverting the virtual machine to the previous safepoint, the system executes a subset of the program instructions as interpreted virtual machine instructions.

In some embodiments, the state mapping maps the contents of registers in the processor to registers in the instruction set architecture of the virtual machine at the safepoint. This state mapping facilitates executing the subset of instructions as interpreted virtual machine instructions.

In some embodiments, the system reverts the virtual machine to a previous safepoint by discarding the results of any native instructions executed after the previous safepoint. In some embodiments, discarding these results may include using the gated store buffer to delay storing a value for a store instruction that executed after the previous safepoint.

In some embodiments, the system inserts a release instruction into the translated native instructions. The system may delay committing results and/or performing writes to memory until this release instruction executes. For instance, the gated store buffer may be configured to delay a memory write associated with a store until the release instruction executes.

In some embodiments, the system determines whether the exception should be handled following the semantics of the virtual machine's instruction set architecture, or if it can instead be handled by the processor's native exception handler.

In some embodiments, the system performs speculative optimization operations while translating the program's virtual machine instructions into native instructions.

One embodiment of the present invention uses register rename maps to facilitate precise exception semantics. The system includes a processor that uses register rename maps to support out-of-order execution, where the register rename maps track mappings between native architectural registers and physical registers for a program executing on the processor. These register rename maps include: 1) a working rename map that maps architectural registers associated with a decoded instruction to corresponding physical registers; 2) a retire rename map that tracks and preserves a set of physical registers that are associated with retired instructions; and 3) a checkpoint rename map that stores a mapping between a set of architectural registers and a set of physical registers for a preceding checkpoint in the program. When the program signals an exception, the processor uses the checkpoint rename map to roll back program execution to the preceding checkpoint.

In some embodiments, the processor preserves values from a preceding checkpoint location for the program in the set of preserved physical registers until results from the checkpointed region are committed.

In some embodiments, the processor commits a checkpointed region by updating the checkpoint map to contain the most up-to-date mappings for architectural registers from the retire rename map and freeing any physical registers that are no longer mapped to by an architectural register in the updated checkpoint rename map.

In some embodiments, the processor supports a non-checkpointed mode in which individual program instructions commit immediately after executing. For instance, the processor can allow individual program instructions to commit immediately by mirroring updates to the retire rename map to the checkpoint rename map, thereby synchronizing updates to the retire and checkpoint rename maps.

In some embodiments, the system uses register rename maps to facilitate precise exception semantics for a virtual machine. In such embodiments, the program may execute in this virtual machine.

In some embodiments, the system provides precise exception semantics to ensure that the virtual machine precisely emulates the behavior and output of the instruction set architecture of the virtual machine. These precise exception semantics include ensuring that the exception is delivered at the precise virtual program counter and with the precise state expected by the instruction set architecture of the virtual machine.

In some embodiments, the processor executes a subset of the program as interpreted virtual machine instructions after rolling back program execution to the preceding checkpoint.

In some embodiments, the processor includes additional physical registers that facilitate out-of-order execution. Note that one subset of the architectural registers for the processor may be subject to checkpointing and roll-back, while a second subset of the architectural registers might not be subject to checkpointing and/or roll-back. In such situations, values stored into the second subset of architectural registers may commit immediately after an associated instruction retires.

In some embodiments, the processor discards the results of any instructions executed after the preceding checkpoint when rolling back program execution. In some embodiments, discarding these results may include discarding values for a delayed store that executed after the preceding checkpoint.

One embodiment of the present invention provides a system that facilitates precise exception semantics for a virtual machine. During operation, the system executes a program in the virtual machine using a processor that includes a gated store buffer that stores values to be written to a memory. This gated store buffer is configured to delay a store to the memory until after a speculatively-optimized region of the program commits. The processor signals an exception when it detects that a load following the store is attempting to access the same memory region being written by the store prior to the commitment of the speculatively-optimized region.

In some embodiments, the processor flushes the contents of the gated store buffer and rolls back program execution to a preceding point in the program to ensure precise exception semantics for the virtual machine. For instance, the process may roll back program execution to a preceding point by restoring virtual state associated with a preceding safepoint and/or by restoring state associated with a preceding checkpoint.

In some embodiments, signaling the exception facilitates avoiding deadlock without needing to include bypass hardware in the processor that retrieves one or more values from the gated store buffer for the load.

In some embodiments, after signaling the exception, the system does one or more of the following: reverts the virtual machine to the preceding point in the program; executes a subset of the program as interpreted virtual machine instructions; adds an additional safepoint and/or checkpoint after the store but previous to the load to ensure that a value associated with the store is written to memory prior to the load; and/or forwards the store value directly to the load using a software bypass mechanism.

In some embodiments, the gated store buffer includes a bypass mechanism that facilitates forwarding values stored in the gated store buffer for limited types of memory accesses.

In some embodiments, the gated store buffer includes values associated with both uncommitted stores as well as committed stores that have not yet been written to the memory. The processor may be configured to not raise an exception when a load attempts to access a value associated with a committed but unwritten store.

In some embodiments, the system may perform a conservative and/or an alternative comparison between a memory region accessed by the load and a memory region accessed by the store to determine whether the two operations access the same memory region. For instance, the system may compare a subset of the physical address bits for the two memory regions, and/or use an alternative alias-detection mechanism to determine whether the gated store buffer may contain a value for the memory region being accessed by the load.

DETAILED DESCRIPTION

Figure 1:
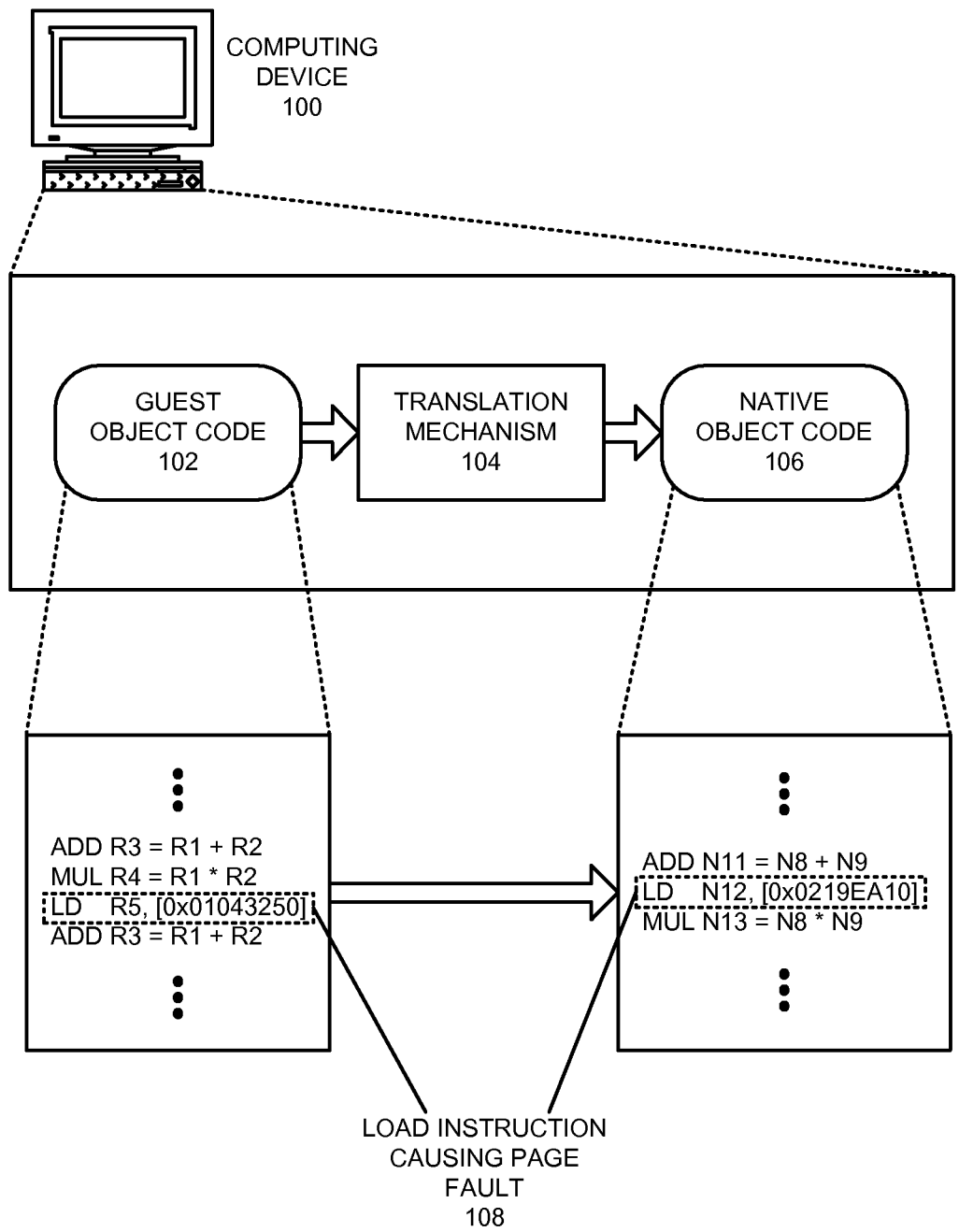
FIG. 1 illustrates a computing device that receives a set of guest object code in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

1. Precise Exception Semantics for Virtual Machines

A virtual machine can be used to emulate different hardware environments upon the physical resources of a computing device. A "system virtual machine" allows the hardware resources of a machine to be shared across one or more different virtual machines, each of which can be associated with different applications running on separate instances of operating systems. In the following description, the hardware upon which the virtual machine executes is referred to as the "native hardware," and is associated with a native instruction set architecture (ISA). A program that was originally compiled for a different set of hardware (referred to as the "original target hardware") with a different ISA is referred to as a "guest" program (which is comprised of virtual instructions). The virtual machine executing on the native hardware supports a virtual ISA that attempts to exactly emulate the ISA of the original target hardware. Note that in some cases, the virtual ISA may not be associated with original target hardware, and may instead provide a platform-independent standard that is used for distributing hardware-independent program code.

Program instructions specified in a virtual ISA typically need to be translated before they can execute in the native ISA of a computing device. This translation process can be implemented in a number of ways. For instance, an instruction set emulator can convert each instruction in the virtual ISA into a set of instructions that emulate the same operation on the native ISA. Note that while this technique strictly emulates the behavior of the original target hardware, such emulation typically increases the number of program instructions and cannot take full advantage of the native hardware of the computing device, and hence often results in slow and inefficient execution of guest programs.

An alternative translation technique that improves guest program performance: (1) analyzes larger blocks of virtual instructions in the guest program; (2) translates these blocks into an intermediate representation; and (3) compiles these intermediate representations into a sequence of optimized native ISA instructions. Executing the resulting block of native instructions on the computing device produces the same results as executing interpreted virtual machine instructions, but improves performance. Note that this alternative translation technique preserves the semantics of the original operations (which most likely were optimized toward characteristics of the virtual ISA), but speculatively re-optimizes the guest program code for the native ISA. Analyzing and translating the virtual instructions at the block level facilitates generating an optimized set of native instructions for the virtual program. Note, however, that guest program exceptions need to be handled by the virtual machine (which emulates the exception semantics of the original target hardware), as opposed to the native hardware, because the native ISA may have different exception semantics.

While the optimizations performed by this alternative translation technique improve performance, such performance improvements often involve re-ordering and/or otherwise modifying the original instructions of the guest program. If translated blocks can be guaranteed to have single entry and exit points, the translation system can optimize (e.g., re-order or otherwise modify) the operations within a given block of instructions, as long as the system can ensure that the entry- and exit-state for the block mirrors that of the corresponding section of the untranslated code. However, because an exception (e.g., a page fault) may occur within a block, single entry and exit points cannot be guaranteed. Hence, if an exception is triggered within a block, an exception handler associated with the guest program and/or a guest operating system executing on the virtual machine may receive different state than if the guest program were executed on the original target hardware. For instance, based on the specification of the virtual ISA, an operating system or debugger executing on the virtual machine might expect a certain set of information in a given set of virtual registers or stack locations at a given instruction. However, if the original instructions were reordered during translation, the state received during an exception may be different.

FIG. 1 illustrates a computing device 100 that receives a set of guest object code 102. Prior to executing guest object code 102 in a virtual machine (not shown), computing device 100 uses translation mechanism 104 to convert guest object code 102 into native object code 106. FIG. 1 includes exemplary instructions for guest object code 102 that have been translated into a corresponding set of exemplary instructions in native object code 106. Note that in this example, optimized native object code 106: (1) eliminates a repeated add instruction considered by the optimizer to be extraneous (specifically, the repeated "ADD R3=R1+R2" instruction); (2) swaps the order of execution for two independent load (LD) and multiply (MUL) instructions; and (3) modifies the instructions to use native registers (N8-N13) instead of the virtual registers (R1-R5) of the virtual ISA.

If the load (LD) instruction (illustrated in guest object code 102 of FIG. 1) triggers a page fault 108, the corresponding virtual ISA behavior may involve loading in the specified page of memory and then re-executing the load instruction. However, if the translation mechanism 104 optimizes the instruction stream to move another instruction ahead of the load (as illustrated in FIG. 1), or moves a previously preceding instruction after the load (not illustrated), the page fault handler may see (or make changes that result in) different state than if guest object code 102 were executing on its original associated hardware. For instance, if the page fault handler changes the value corresponding to register R1 (in native register N8) during a page fault, this change would affect the result (in native register N13) of the multiply instruction in native object code 106, which was moved after the load instruction by the optimizer. However, changing the value in R1 during a page fault for the load instruction would not affect the result of the multiply instruction in guest object code 102 when executed on the original target hardware. Furthermore, because the second add in guest object code 102 is eliminated during translation, the value in native register N11 would not be updated based on the updated value for register R1 from the page fault, and hence the output value corresponding to virtual register R3 would be erroneous at the end of the block.

Hence, optimized native program code may generate substantially different results from guest program code in the presence of exceptions, due to some values being computed earlier and/or later than originally expected. Note that while the above guest code is exemplary, similar situations can occur in both hand-assembled and/or compiled program code. Store instructions can cause even more severe issues, because once a value has been written to memory, the system cannot easily unroll or re-execute instructions correctly (as discussed in more detail in following sections). While optimization techniques are typically concerned with the "liveness" of values seen by the outside world (e.g., values visible to other processes in the computing device), the need to generate exactly the same state for an exception handler interferes with the ability of the optimizer to re-order operations and generally complicates optimizing guest programs. If the optimizer is forced to consider all possible exception paths, it would need to consider every value prior to a possible exception to be "live." More specifically, because the exception path is dependent on every preceding instruction, and anti-dependent on every following instruction, considering the exception path during optimization would preclude re-ordering instructions, and would limit performance to the per-instruction emulation described above.

Situations that generate different results in the presence of exceptions violate precise exception semantics, and can result in erroneous results. To precisely emulate a set of hardware, a virtual machine executing on different hardware must ensure that the exception semantics and state available to the exception handler for the virtual machine are exactly the same as if executing on the original target hardware. Specifically, when the native machine executing the virtual machine receives a page fault, it needs to ensure that, from the program perspective, this page fault has the same state as a page fault on the hardware being emulated. For instance, a developer using a debugger inspects a guest program that is executing on a virtual machine should see exactly the same state at a given exception that would be seen at the same program counter on the original target hardware. Note that even if the underlying native hardware supporting the emulation does not take a page fault, but the emulated hardware would have taken a page fault when executing the original guest program code, correctness would require that the virtual machine raise an exception as if the guest program had actually taken a page fault.

In summary, precise exception behavior dictates that every instruction preceding a given load or store has committed (e.g., executed, and updated associated values in memory and/or registers), and that every following instruction has not been executed. If an optimizer breaks these invariants, and the native ISA signals an exception that needs to be handled by the virtual machine, the results seen by the virtual machine's exception handler may be incorrect, thereby violating the semantics of the virtual ISA. Embodiments of the present invention facilitate optimizing guest object code while preserving precise exception semantics.

2. Using Safepoints to Provide Precise Exception Semantics

In some embodiments of the present invention, the system "rolls back" an executing program to a "safe" point in the program when an exception is raised, and then re-executes a portion of the program in a manner that guarantees precise exception semantics. For instance, while translating the guest program to the native ISA, the translation mechanism (e.g., an optimizing dynamic compiler) can insert safepoints into the native program code. At each safepoint, the system records a mapping between the values that should exist for the virtual state at that safepoint and the locations where the values actually exist in the physical state of the native hardware. These mappings are generated by the compiler at compile time, and can include: tables that store all of the legal values for the virtual state at the safepoint (including register and stack values); a mapping between the native program counter and the virtual program counter at the safepoint; and information that indicates how to restore the saved values to the appropriate locations so that the system can revert the state of the virtual machine to the specified virtual program counter for the safepoint. Note that while taking both safepoints and "checkpoints" involves identifying a valid and/or coherent point in a program, these two terms are distinct. Inserting a safepoint typically does not involve making additional verbatim copies of values, but instead facilitates recovering precise virtual state by preserving mappings to previous values so that such values can be restored as needed. In contrast, taking a checkpoint typically involves making an additional copy of virtual and/or native state that can be used to restore program execution to a previous state.

During execution, when a native instruction triggers an exception, the system can: (1) temporarily ignore the exception and halt forward execution; (2) restore the values for the most recent safepoint to the locations expected by the virtual machine at the associated virtual program counter, thereby rolling back execution to that safepoint (and discarding the results of any native instructions executed after the safepoint); and (3) re-execute the subsequent instructions (including the instruction that triggered the exception, which will re-trigger the exception) as interpreted virtual instructions instead of as optimized native instructions. By reverting to a safepoint where the saved mappings guarantee that the virtual state is correct, and then re-executing the instructions as interpreted virtual instructions, the system ensures that the instructions after the safepoint are executed in exactly the same order as on the original target hardware, thereby ensuring that the virtual state associated with the exception is precise. The virtual machine can then execute its exception handler to handle the exception, after which it continues to execute interpreted instructions until the next safepoint (e.g., the end of a block of guest program code), at which point the system may resume executing optimized native instructions for the subsequent block of instructions. Note that before resuming the execution of subsequent optimized native instructions, the system may need to ensure that values computed using interpreted virtual instructions (and expected by subsequent native instructions) are stored in the native registers that will be accessed by the subsequent native instructions.

In some embodiments, the system may need to ensure that values needed to restore virtual state for a safepoint are kept available longer than they might otherwise be. For instance, the compiler may need to extend the live range of a variable to ensure that a value for the variable remains available until the following safepoint. Note also that the tables and mappings generated by the dynamic compiler to support safepoints can be maintained in the runtime environment, thereby allowing the system to restore the values from a preceding safepoint without adding additional instructions to the translated program code. Hence, because the mappings needed for safepoints are computed at compile time and stored in the runtime environment, no additional instructions need to be added into the program code to store mappings, and there are no run-time actions that are associated with reaching a safepoint.

Figure 2:
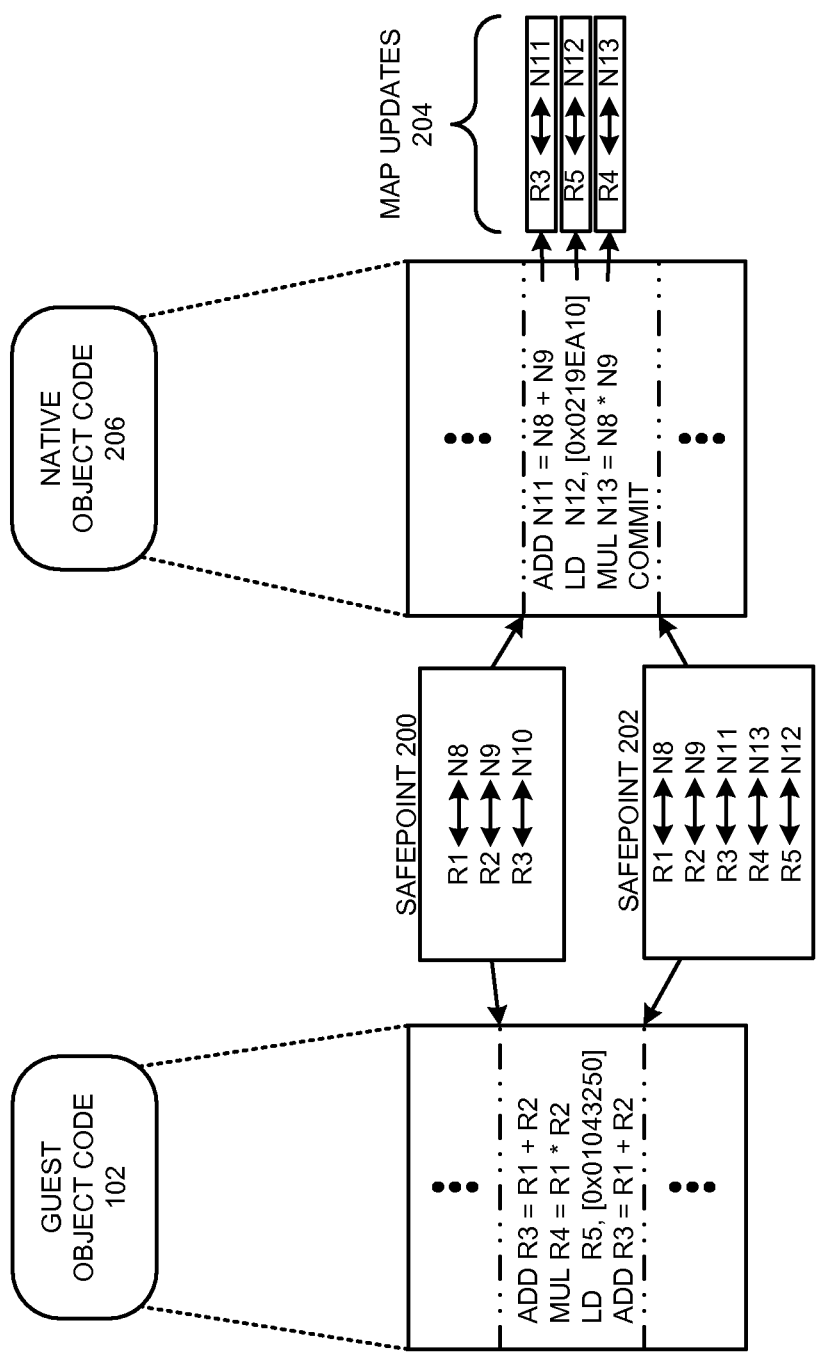
FIG. 2 illustrates several safepoints that can be used to roll back execution for a set of guest object code and associated native object code in accordance with an embodiment of the present invention.

FIG. 2 illustrates several safepoints 200-202 that can be used to roll back execution for the guest object code 102 illustrated in FIG. 1. The system maintains (e.g., in the runtime environment) a mapping for the current values of the virtual machine for safepoint 200 that indicates the registers in use for the virtual state at safepoint 200 and where values for those registers are stored (e.g., a mapping between virtual registers R1-R3 and native registers N8-N10), so that the system can revert program execution to safepoint 200 if needed. Note that native object code 206 may include an additional release instruction that controls a gated store buffer (see the description of gated store buffers below). The virtual state mapping stored (e.g., in the runtime environment) for safepoint 202 reflects the virtual state from safepoint 200 with the addition of a set of map updates 204 that correspond to changes to the virtual state caused by the instructions between safepoint 200 and safepoint 202.

If the load instruction in native object code 206 does trigger a page fault, the system uses the mappings for safepoint 200 to roll back execution to safepoint 200, and then executes the subsequent virtual instructions in guest object code 102 following safepoint 200 as interpreted virtual instructions. After executing the second (interpreted) add instruction, the system reaches the next safepoint, safepoint 202. As mentioned previously, no run-time actions are associated with reaching a safepoint, but at this point, the system may execute the subsequent block of instructions (not shown) as native object code. Alternatively, in some configurations, the system may continue to execute the next block in guest object code 102 (not shown) as interpreted virtual instructions. Note that the system can use safepoints to roll back virtual machine state purely in software, and that native execution does not need to be rolled back. Note also that a number of software techniques can be used to restore the virtual state of a safepoint following an exception. For instance, the system may transfer control to the runtime environment, which can then use the mappings stored for the safepoint to restore the virtual state. Alternatively, the compiler, while compiling the guest program, may also create a handling function that can be called (e.g., by the exception handler) to restore the virtual state from the previous safepoint.

In some embodiments of the present invention, an optimizing compiler in the translation mechanism is configured to determine the frequency of safepoints for the guest program based on the instructions in the guest program, and generates a set of virtual state mappings for each safepoint (which can be maintained in the runtime environment). The optimizing compiler may determine an interval between safepoints based on a number of parameters and/or factors. For instance, a longer interval between safepoints (resulting in larger blocks of instructions for each safepointed region) might lower overhead by allowing the mapping of the virtual state to be stored for fewer locations, but might also involve re-executing a larger number of instructions as interpreted instructions when an exception is triggered. Alternatively, a smaller interval between safepoints might involve higher overhead (due to storing mappings for safepoints for more locations), but require fewer instructions to be executed on average during roll-backs. The optimizing compiler may determine such intervals based on the types of instructions encountered in the guest program and/or an expected likelihood of needing to roll back a given section of the guest program. Note that the system can, while translating the guest program instructions to native instructions, ensure that the native registers used to preserve safepointed values are not re-used in the safepointed region. Hence, the system can ensure that the values needed to restore the virtual state for the safepoint are not accidentally overwritten.

Figure 3:
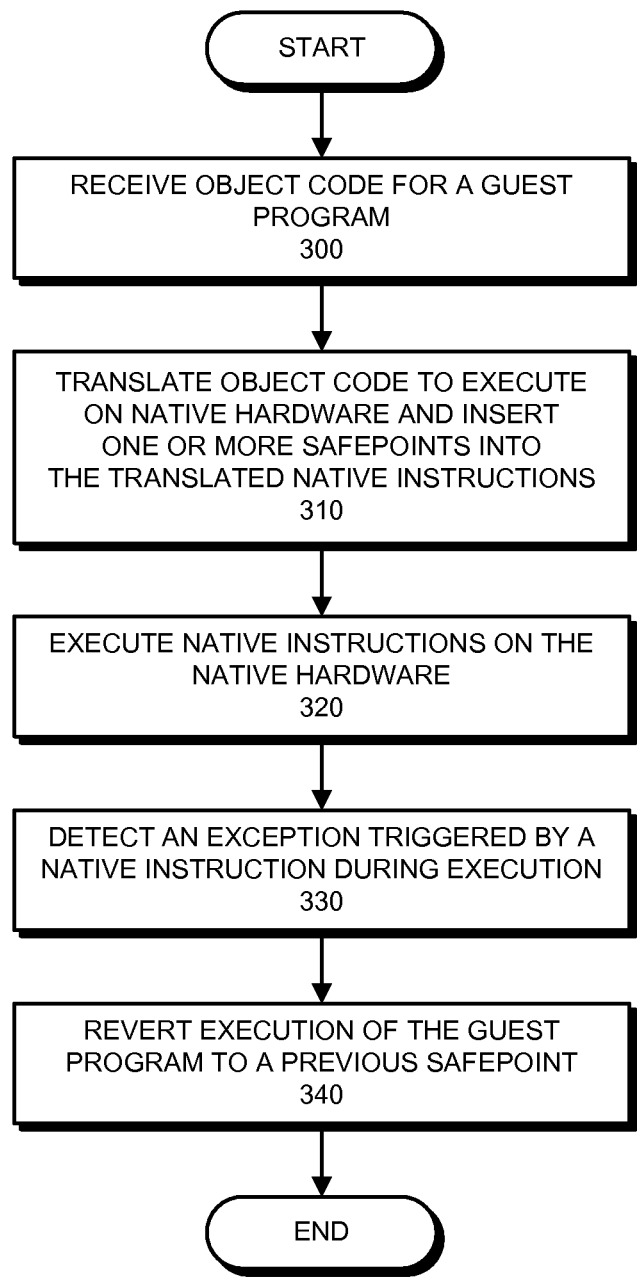
FIG. 3 presents a flow chart illustrating the process of providing precise exception semantics for a virtual machine using safepoints in accordance with an embodiment of the present invention.

FIG. 3 presents a flow chart illustrating the process of providing precise exception semantics for a virtual machine using safepoints. During operation, the system receives object code for a guest program (operation 300), where the object code contains instructions specified in an instruction set architecture of the virtual machine. The system translates this object code into native instructions that can execute on the native hardware upon which the virtual machine is executing, and in doing so, inserts one or more safepoints into the translated native instructions (operation 310). The system then executes these native instructions on the native hardware (operation 320). When the system detects that a native instruction has triggered an exception during execution (operation 330), the system reverts execution of the guest program (and hence reverts the state of the virtual machine) to a previous safepoint to ensure that the virtual machine will precisely emulate the exception behavior of the virtual machine's ISA (operation 340).

Note that in some embodiments the system may need to determine whether a given exception raised by the native hardware actually applies for the virtual machine. When the system detects an exception in the native hardware's ISA, the virtual machine's exception handler checks the type of the exception. When the system determines that the exception is of a type that should be reflected in the virtual machine's ISA (e.g., a page fault for a memory address accessed by the guest program), the exception handler rolls back execution to the most recent safepoint. For exceptions that do not need to be reflected in the virtual machine's ISA, and are only relevant for the native hardware, the native hardware's exception handler can handle the exception without needing to roll back execution of the guest program.

2.1 Gated Stores

Store instructions can complicate the process of rolling back to a safepoint. As mentioned previously, to successfully roll back to a preceding safepoint, the system needs to discard the results of any native instructions that were executed after the previous safepoint. However, once a value written by a store instruction has been written to memory, the store instruction has essentially committed (and may already be visible to other processes), and cannot easily be rolled back. Hence, in order to allow execution to be rolled back to a previous safepoint, the system needs to ensure that memory writes are delayed until the block of instructions containing the store instruction commits.

Figure 4:
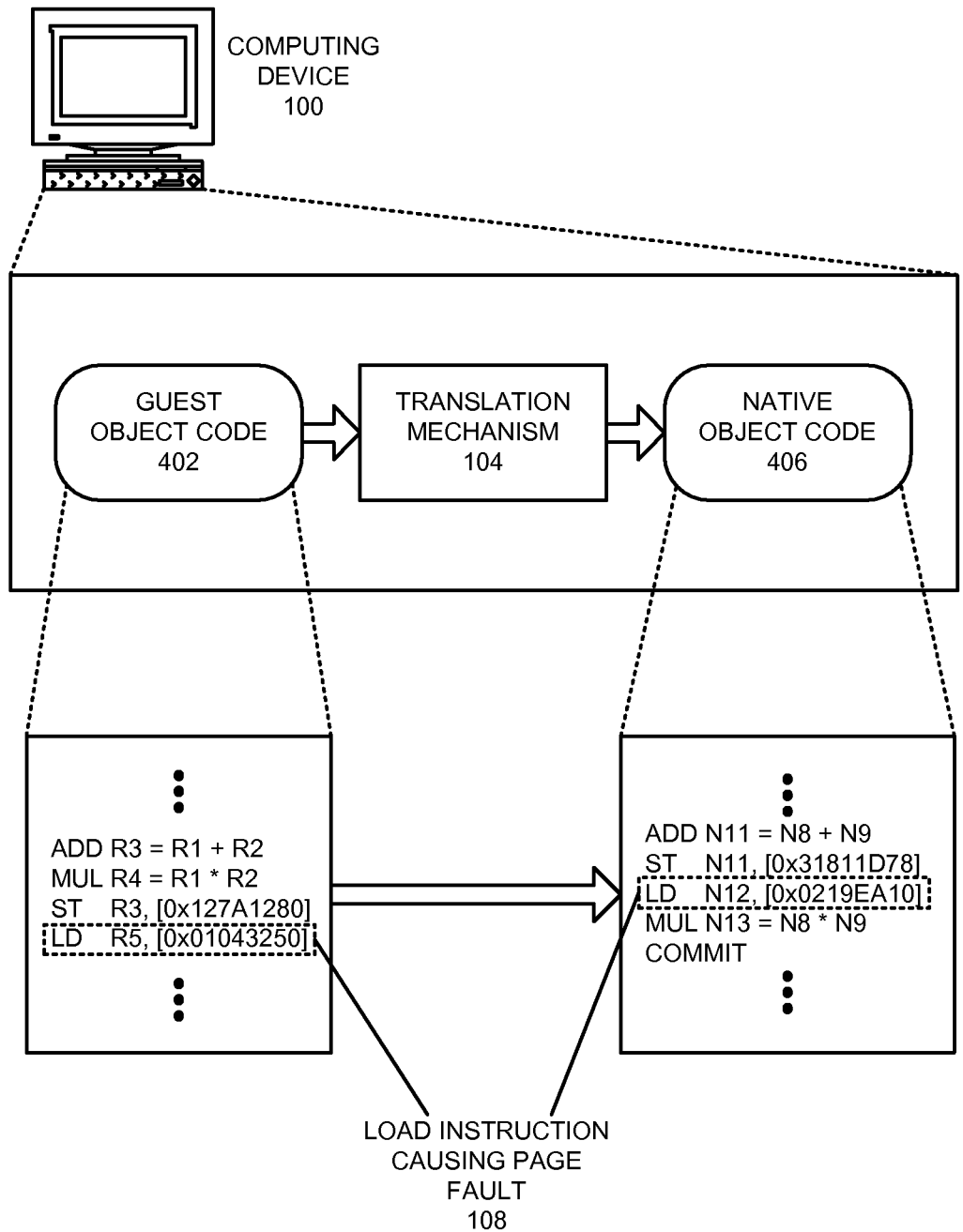
FIG. 4 illustrates guest object code and native object code that include a store instruction in accordance with an embodiment of the present invention.

FIG. 4 illustrates guest object code 402 and native object code 406 that include a store (ST) instruction prior to a load instruction. After the store instruction in native object code 406 has executed, other processes in the system will typically already be able to see the written value in memory, and rolling back execution will violate precise state semantics (unless the store can be undone). Furthermore, if the value in the memory location written to by the store is used earlier in the same block of code, writing that memory location and then attempting to roll back to the beginning of the block corrupts the values used in the next iteration of executing the block, thereby making the program results incorrect.

In some embodiments of the present invention, the system includes a store buffer that allows store instructions to be "gated." Values written by gated stores are not immediately committed to memory (e.g., a level two cache), but instead are held in the store buffer until another instruction releases or discards them. During translation, the system uses the gated store buffer to ensure that stores in the guest program only commit at the next safepoint in the translated code stream (e.g., when execution reaches a special release instruction). In the case that the system needs to roll back execution of a guest program to a previous safepoint, the system discards the values in the gated store buffer for such uncommitted stores. Hence, by using gated stores, the system can ensure that blocks of instructions containing store instructions can still be rolled back and re-executed.

Figure 5A:
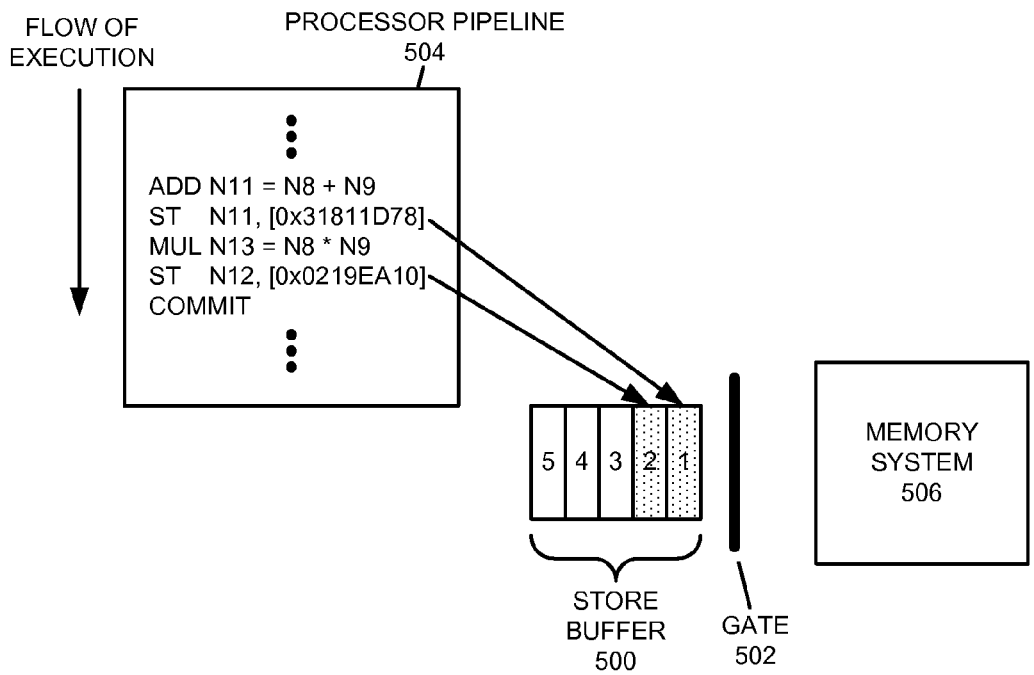
FIG. 5A illustrates a closed gated store buffer in accordance with an embodiment of the present invention.
Figure 5B:
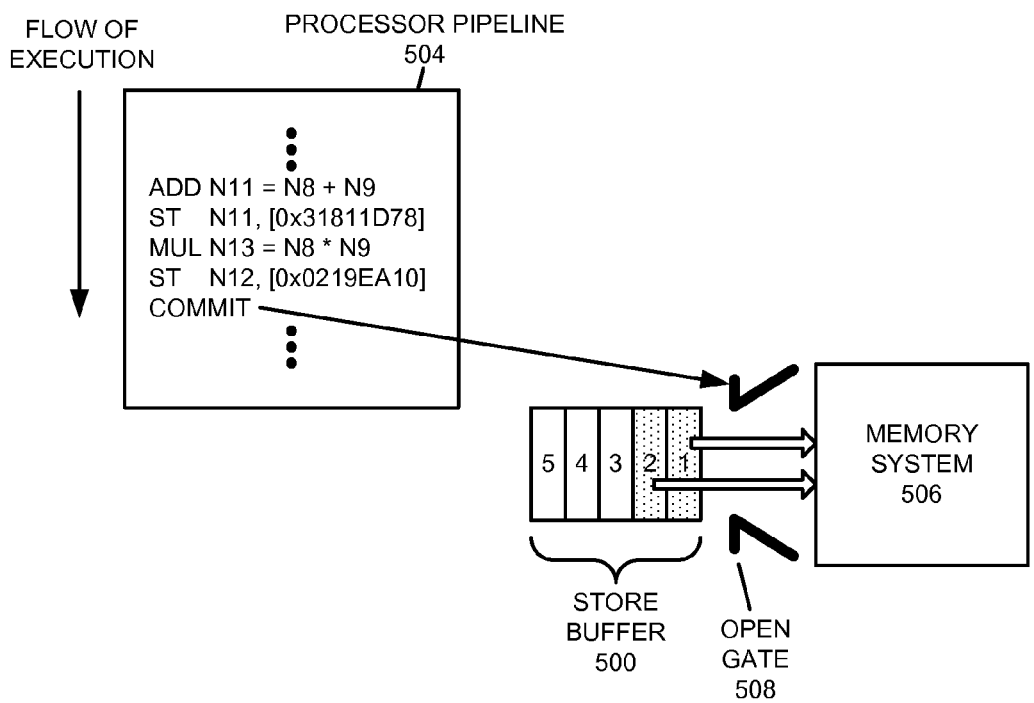
FIG. 5B illustrates an open gated store buffer in accordance with an embodiment of the present invention.

FIGS. 5A and 5B illustrate a closed and open gated store buffer, respectively. In non-gated hardware implementations, a processor pipeline executing a store directly passes the value to be stored and its destination memory address to a memory subsystem, which proceeds to write the value to that location. In contrast, FIG. 5A illustrates a store buffer 500 and gate 502 that are placed between the processor pipeline 504 and memory system 506. While the gate is closed (as illustrated in FIG. 5A), values to be stored remain held in store buffer 500 instead of being immediately written to memory system 506. When execution reaches the end of a speculatively-optimized (e.g., safepointed) region (e.g., reaches and executes a release instruction that was inserted at the end of the region), the system releases the delayed stores by opening the gate 508 (as illustrated in FIG. 5B), at which point all of the delayed stores are released to memory system 506. After these stores have been written, the system closes the gate again (not shown) prior to executing the next speculatively-optimized region.

Note that maintaining precise exception semantics does not require the system to ensure atomicity for the delayed stores (e.g., by requiring that the resulting memory writes are synchronized). For instance, while transactional memory techniques provide some overlapping benefits by ensuring that stores for a transaction are not visible until a transaction commits, such techniques also involve considerable additional hardware and software complexity. In contrast, a gated store buffer provides only a basic guarantee that stores will not occur prior to the end of a speculatively-optimized region, thereby enabling rolling back program execution, but does not provide any additional guarantees about when the values are actually stored into the memory system. Hence, gated store buffers typically involve substantially less hardware overhead and complexity than other techniques which require more sophisticated guarantees.

In some embodiments, combining a gated store buffer with software safepointing techniques can provide precise exception semantics with reduced hardware complexity while minimizing an impact on program performance. By using a gated store buffer, the system provides substantial performance benefits over software-only techniques that facilitate unrolling store instructions by: (1) writing stores to a sandbox, and then copying the stored values to the correct locations in memory at the end of a speculatively-optimized region, or (2) prohibiting an optimizer from optimizing around stores (e.g., by requiring a safepoint after each store instruction in the guest program and restricting code mobility around store instructions). Furthermore, by limiting the needed hardware support to only a gated store buffer, the described techniques reduce hardware complexity. For instance, some hardware-intensive rollback techniques copy register contents into additional dedicated sets of shadow registers during execution, and then roll back execution by copying the contents of shadow registers back into primary registers and resetting the program counter. Other hardware-intensive techniques require special exception tag bits for hardware registers, and/or require translated code to be mapped into a fixed location in memory. Such hardware techniques can be very resource intensive (e.g., replicating the full register set of the native hardware) in comparison with a gated store mechanism.

The described embodiments combine a mix of hardware (in the gated store buffer) and software (e.g., safepoints and restore maps or tables) to provide a more general approach that facilitates optimizing code freely and preserving precise exception semantics without adding significant complexity (e.g., replicating registers) to the native hardware. Note that in some embodiments, the native hardware may provide some additional hardware support for maintaining the state at a safepoint, e.g., by maintaining a checkpoint. However, if such capabilities are not available, the virtual machine can instead use software-only techniques that maintain safepoint state.

In summary, some embodiments of the present invention allow native hardware to precisely and efficiently emulate exception behavior for a different set of hardware using a hardware gated store buffer and software safepointing techniques. By rolling back execution to the beginning of a speculatively-optimized region when an exception is triggered, the described system can re-execute program blocks of a guest program as interpreted code, thereby ensuring that the exception is delivered at the precise virtual program counter and with the precise virtual state expected by the virtual machine's ISA. By preserving precise exception semantics, these techniques allow the native hardware to correctly emulate the behavior of multiple, different virtual systems simultaneously and correctly.

3. Using Register Rename Maps to Provide Precise Exception Semantics

Processors which support out-of-order execution (OOO) typically include two register rename maps, along with a set of physical registers which is larger than the set of architectural registers described in the ISA. These extra registers and register rename maps provide expanded working storage that facilitates executing instructions in a different order from the incoming instruction stream. For instance, the processor can use the extra physical registers to preserve values that are needed by instructions that are delayed and/or reordered, and to preserve results that are produced by instructions which are executed (and complete) early. The processor maintains the two register rename maps (also referred to simply as "rename maps") to track the mappings between architectural and physical registers during execution. For instance, the processor may use the first rename map as a "working register rename map" that tracks a mapping between architectural and physical registers and is queried as instructions are speculatively decoded to determine which physical registers should be used by each instruction. The processor can use the second rename map as a "commit register rename map" that tracks a similar mapping as instructions commit to determine when specific physical registers are no longer being used, as well as to maintain precise processor state in the event of an exception or misspeculation. For example, when an instruction finishes storing an output value in a physical register (that is associated with a given architectural register), the processor may determine that a value in another physical register that was previously associated with the architectural register is no longer required by any remaining instructions, and free the no-longer-needed physical register for future use. When an instruction is decoded, the processor may also update the working register rename map to reflect the new mapping for the architectural register, so that following instructions that should logically execute after the decoded instruction use the updated physical register location and thereby the value that will be produced. The processor essentially tracks register dependencies for (potentially out-of-order) instructions, and associates the instructions with "pointers" to the physical registers that hold the values that the instructions will need during execution.

Figure 6:
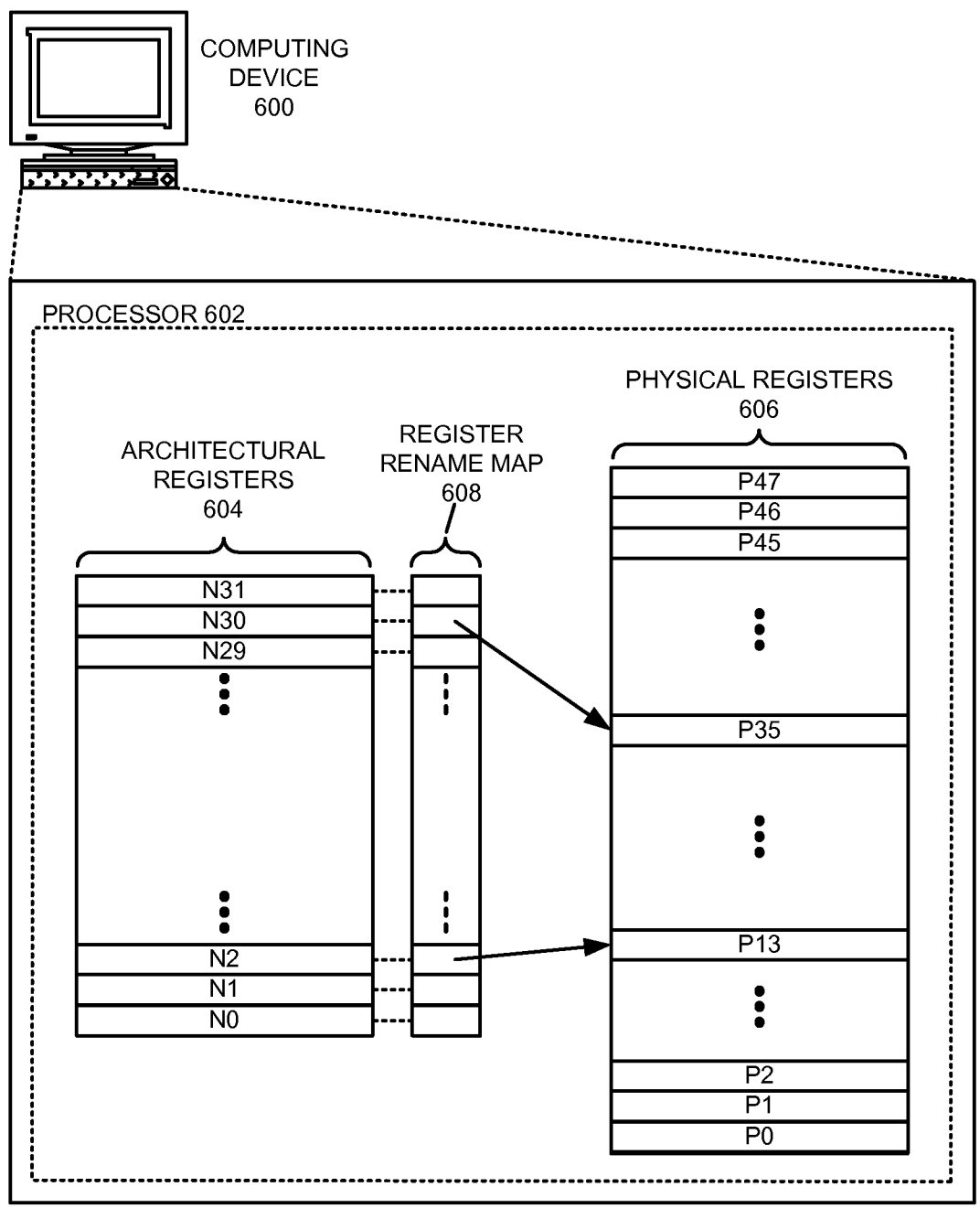
FIG. 6 illustrates an out-of-order processor with a register rename map in accordance with an embodiment of the present invention.

FIG. 6 illustrates a computing device 600 that uses an out-of-order processor 602 with a register rename map 608. Processor 602 is associated with an ISA that specifies 32 architectural registers 604 (N0-N31). Processor 602, however, actually includes 48 physical registers 606 (P0-P47), where the extra registers can be used to store values needed by delayed instructions or results that were produced by instructions that have completed early. Register rename map 608 provides a mapping between architectural registers 604 and physical registers 606.

Figure 7:
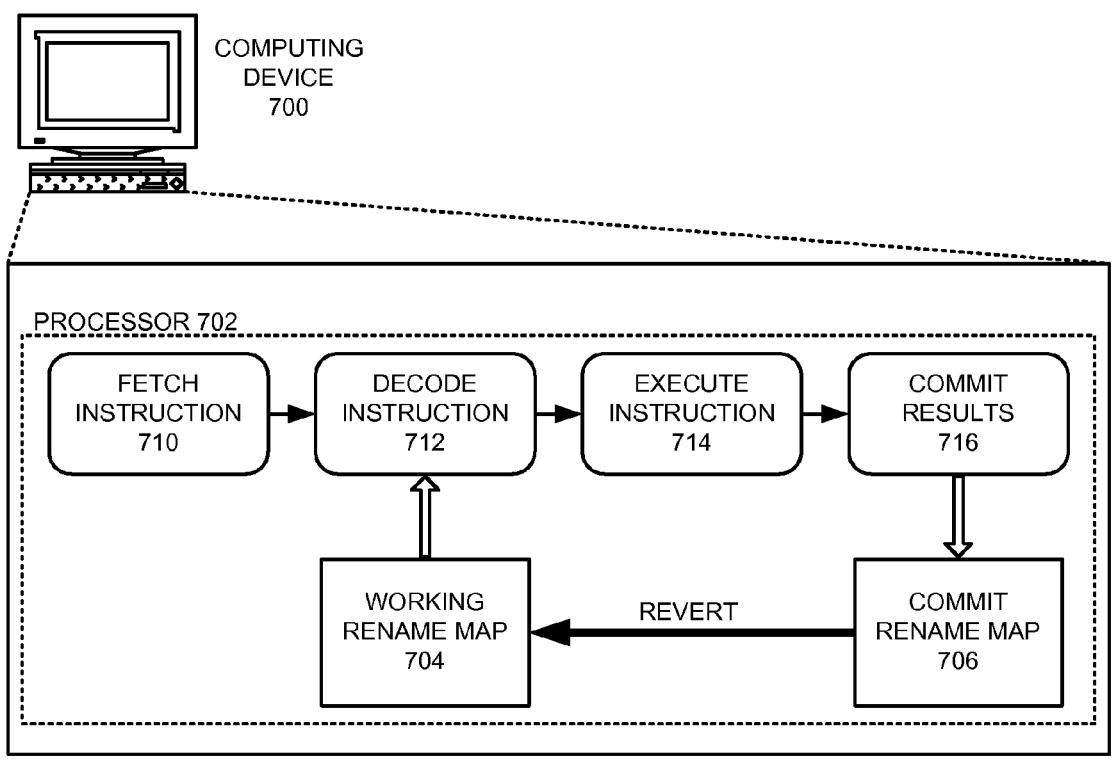
FIG. 7 illustrates a processor that uses two register rename maps to support out-of-order execution in accordance with an embodiment of the present invention.

FIG. 7 illustrates a computing device 700 with a processor 702 that uses two register rename maps to support out-of-order execution. This illustration and example is based on an out-of-order processor that: 1) decodes instructions in-order; 2) executes instructions out-of-order; and then 3) commits instructions in-order. After fetching the next in-order instruction 710, processor 702 decodes the instruction 712 and uses working rename map 704 to determine the set of physical registers that should be associated with the decoded instruction. Processor 702 also updates working rename map 704 to ensure that the destination architectural register for the instruction also correctly maps to the updated destination physical register. Next, processor 702 executes the instruction 714 (potentially out-of-order). After the instruction has been successfully executed, processor 702 commits the results 716 to a destination physical register, and updates commit rename map 706. While committing the instructions (in-order), processor 702 updates commit rename map 706 and releases any physical registers that are no longer needed after the instruction has committed. Note that physical register values are preserved until an entry referring to them in the commit rename map is overwritten. Note that processor 702 may use working rename map 704 and/or additional hardware to track dependencies (e.g., to stall out-of-order instructions that depend on one or more values that have not yet been computed by uncommitted instructions). Note also that updates to commit rename map 706 update mappings in the same manner as working rename map 704, but lag behind the changes to working rename map 704, because commit rename map 706 reflects the updates for a given instruction only after all preceding instructions have been committed.

A processor with two register rename maps can recover precise architectural state for a given uncommitted instruction (e.g., on an exception or interrupt) by replacing the working register rename map with the commit register rename map (as illustrated in FIG. 7 by the "REVERT" arrow), thereby discarding any results for any uncommitted instructions and rolling back execution to the last committed instruction. However, this operation provides only roll-back capability in the native architecture, and does not preserve precise exception semantics at the virtual ISA level. The processor can only guarantee precise virtual exception semantics if it can roll execution back to a point where the virtual state for the guest program is known to be precise.

In some embodiments of the present invention, the system provides precise exception semantics for a virtual machine on a processor that supports out-of-order execution by: (1) preserving values from a previous point in the program using additional physical registers; and (2) using a third register rename map that checkpoints the state for a translated guest program executing on the processor. This "checkpoint rename map" is not updated as fully executed instructions are retired from the processor pipeline, but instead preserves a set of mappings that facilitate rolling back the executing guest program to a previous checkpoint where the guest program's virtual state was precise.

In some embodiments, the working rename map continues to operate as described above, mapping native architectural registers that are associated with an issuing instruction to corresponding physical registers that contain operands for that instruction. The second rename map, now referred to as the "retire rename map," however, functions slightly differently from the previously described commit rename map. Previously, when updating the commit rename map, the processor would determine any physical registers that were no longer needed by unexecuted instructions, and would identify such registers as being available for other purposes. The retire rename map does still map architectural registers to the physical registers that contain the results of executed instructions. However, the processor: (1) does not free the physical registers if they are still referenced from the checkpoint rename map; and (2) considers the executed instructions to be "retired," but not committed. The checkpoint rename map continues to track physical registers to preserve values from previous instructions beyond the timeframe in which they are needed by any unexecuted instructions. The processor can use these preserved register contents and the checkpoint rename map to roll back execution of the guest program to a previous checkpoint. Hence, the system can use the three rename maps and extra physical registers to execute a window of uncommitted instructions, thereby ensuring that a checkpointed region executes correctly before any results are released and, if not, unwinding execution so that the region can be re-executed in a manner that guarantees precise exception semantics. Note that by preserving values in physical registers and maintaining the checkpoint map, the system allows software to dictate when the physical registers will be freed, instead of relying solely on hardware tracking of instruction register use to determine when physical registers can be re-used.

In some embodiments, the system uses a specialized instruction from the native ISA to indicate checkpoint locations where all previous speculative state will be committed and data for a new checkpoint will be preserved. As described previously, such checkpoint instructions are inserted into the native object code at the time the system translates the guest program to a set of native instructions. To commit speculative state, the system copies the retire rename map to the checkpoint rename map when the checkpoint instruction commits. Note that at this point, the final mapping between each architectural register and an associated physical register is preserved, and any physical registers which were replaced in the checkpoint map are freed. Hence, additional values that were preserved in other physical registers (to allow roll-back of execution) are maintained until the next checkpoint is reached, at which point the historical values are discarded and only the current mappings for the architectural registers are kept (and copied to the checkpoint map, to serve as the next checkpoint).

Prior to reaching a checkpoint instruction, the system can roll execution back to the program counter of the previous checkpoint by overwriting both the working rename map and the retire rename map with the contents of the checkpoint rename map. During this process, the system frees all physical registers (in the working and retire rename maps) to which the checkpoint map does not map architectural registers. After performing these operations, the system has reset program execution to the checkpoint, and can re-execute the subsequent instructions in a way that provides precise exception semantics. For instance, as described above, the system may re-execute a subsequent set of guest program instructions that follow the checkpoint as interpreted virtual instructions. Alternatively, the system may use other techniques to ensure that an event that triggered a roll-back (e.g., an exception) is handled in a way that guarantees precise exception semantics.

Note that the retire rename map may also be used for purposes other than delaying updates to the commit map. For instance, the system may also use the retire rename map to recover from misspeculation (e.g., branch misprediction) within the processor pipeline. In this scenario, the system can use the retire rename map in a manner similar to systems with only two rename maps. For example, the system may overwrite the working rename map with the contents of the retire rename map to recover to the last retired instruction point, and free any physical registers that are thereby overwritten in the working map. The commit map is not affected by this operation. This technique allows the system to recover from branch mispredictions without having to revert all the way back to a preceding checkpoint location. Note that while the conventional two-map method uses the same recovery technique (reverting to the commit rename map) to handle both architecturally-visible exceptions as well as transparent speculation, the system described in the present invention splits these two cases into two scenarios (e.g., reverting to the checkpoint map vs. overwriting the working rename map with the retire rename map).

Figure 8A:
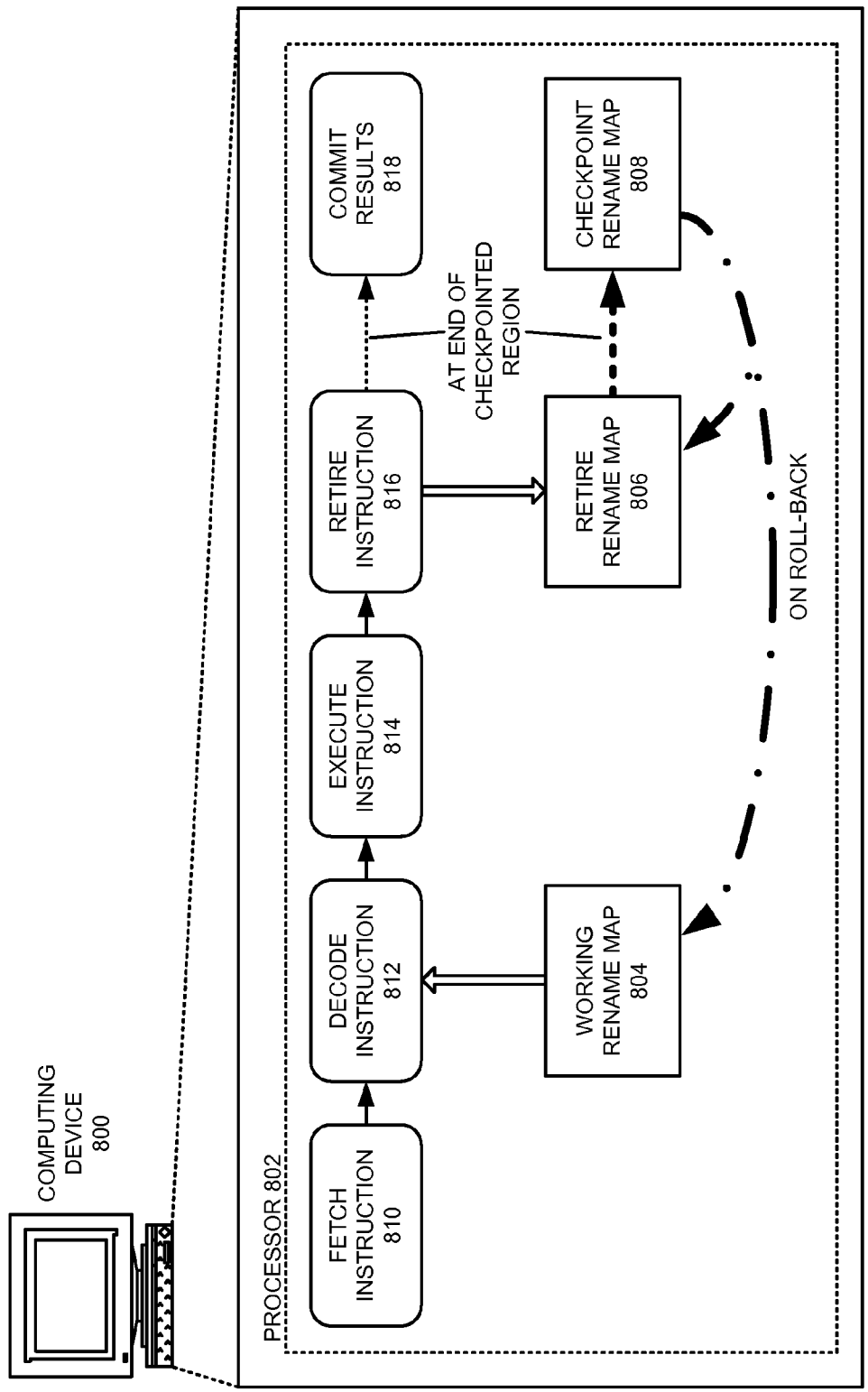
FIG. 8A illustrates an out-of-order processor that uses three register rename maps to support checkpointing in accordance with an embodiment of the present invention.

FIG. 8A illustrates an out-of-order processor that uses three register rename maps to support checkpointing. As described for FIG. 7, after fetching an instruction 810, a processor 802 in a computing device 800 decodes the instruction 812 and uses working rename map 804 to determine the set of physical registers that should be associated with the decoded instruction. Next, processor 802 executes the instruction 814. However, after the instruction has been successfully executed, processor 802 does not yet commit the results for the executed instruction, but instead stores the results in the specified destination physical register and then retires the instruction 816. During this operation, processor 802 updates retire rename map 806 to ensure that the destination architectural register from the retired instruction now correctly maps to the updated destination physical register. The previously-mapped physical register in the rename map is freed only if it is not referenced by the checkpoint map. Only when program execution reaches the next checkpoint are the results of instructions in the checkpointed region committed 818. At this point, the most recent mappings from retire rename map 806 are written to checkpoint rename map 808, where they overwrite any mappings from the previous checkpoint. The system can roll back program execution in a checkpointed region by flushing any instructions in the processor pipeline and overwriting retire rename map 806 and working rename map 804 with the mappings in checkpoint rename map 808, thereby restoring the state of execution to the values stored for the preceding checkpoint.

Figure 8B:
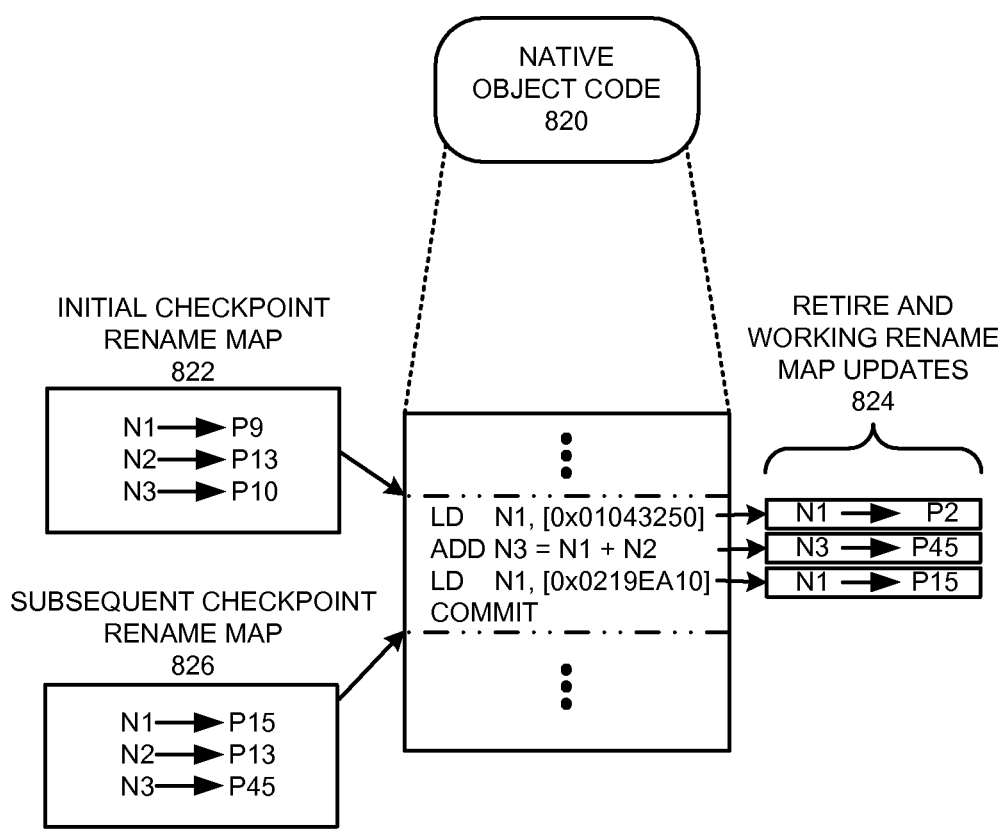
FIG. 8B illustrates exemplary native object code for a guest program that is executed on an out-of-order processor that uses three register rename maps to support checkpointing in accordance with an embodiment of the present invention.

FIG. 8B illustrates exemplary native object code 820 for a guest program that is executed on an out-of-order processor that uses three register rename maps to support checkpointing. Note that the three rename maps are not illustrated in their entirety, but follow the structure of the register rename map 608 illustrated in FIG. 6. Initial checkpoint rename map 822 maps three architectural registers (N1-N3) to three physical registers (P9, P13, P10). Instructions that execute subsequently to the initial checkpoint trigger a set of updates to the retire and working rename maps 824. The system, upon decoding the first load instruction, determines that the instruction will need to store a result in a physical register, allocates an available physical register (P2) for this result, and proceeds to execute the instruction. During this process, the system updates the working and retire rename maps to reflect this mapping (e.g., so that subsequent instructions that depend upon this result get the right value, and, if needed, are delayed until the result is ready). When the system decodes the second instruction, an add instruction, it uses the mapping from the working rename map to determine the physical registers that contain the operands (P2 and P13), allocates another physical register (P45) for the result, and proceeds to execute the instruction using the values in the physical registers. Upon issuing the second load instruction, the system allocates a third physical register (P15) for the result.

As each of the three instructions retires, the system updates the retire rename map as needed. However, in contrast to a system without checkpoints, the system does not commit the results and free physical registers that are no longer needed. For instance, while an un-checkpointed system could immediately free register P9 after retiring the first load instruction, the illustrated system preserves the previous value for N1 (in P9) until the next checkpoint instruction. Upon successfully executing the checkpointed region, the system commits the set of results from the checkpointed region and writes the current mappings from the retire rename map into the checkpoint rename map (illustrated as subsequent checkpoint rename map 826). If the system needs to roll back execution in the checkpointed region, it can flush the processor pipeline and overwrite the retire and working rename maps with the mappings from the initial checkpoint rename map 822, thereby effectively discarding the results of any instructions executed after the preceding checkpoint and returning the state of the system to that checkpoint.

Figure 9:
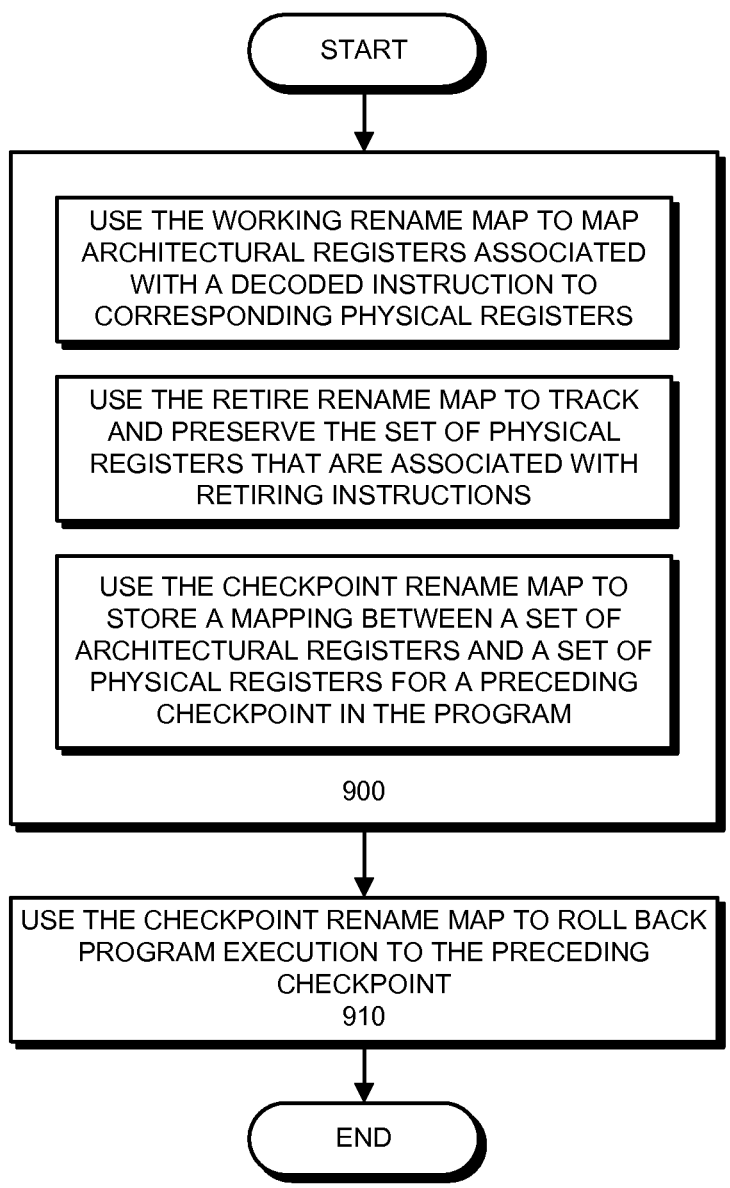
FIG. 9 presents a flow chart illustrating the process of using register rename maps to facilitate providing precise exception semantics in accordance with an embodiment of the present invention.

FIG. 9 presents a flow chart illustrating the process of using register rename maps to facilitate providing precise exception semantics. The program executes on a processor that supports out-of-order execution and tracks mappings between architectural registers and physical registers using a working rename map, a retire rename map, and a checkpoint rename map. While executing the program, the system: (1) uses the working rename map to map architectural registers associated with a decoded instruction to corresponding physical registers; (2) uses the retire rename map to track and preserve the set of physical registers that are associated with retiring instructions; and (3) uses the checkpoint rename map to store a mapping between a set of architectural registers and a set of physical registers for a preceding checkpoint in the program (operation 900). When the program causes an exception, the system uses the checkpoint rename map to roll back program execution to the preceding checkpoint (operation 910). By facilitating rolling program execution back to a point in the program where the state is precise, the system facilitates providing precise exception semantics.

Note that, as described previously, store instructions can complicate the process of rolling back to a checkpoint. Hence, in some embodiments, an out-of-order processor that uses the three described rename maps and additional physical registers to facilitate precise exception semantics is combined with a gated store buffer (described in previous and the following sections in more detail) that allows multiple stores to be executed speculatively within a checkpointed region. In some embodiments, the checkpoint instruction may also act as the release instruction that controls the gated store buffer.

In some embodiments, the processor supports a non-checkpointed mode in which individual program instructions commit immediately after executing. For instance, the processor can allow individual program instructions to commit immediately by mirroring updates to the retire rename map to the checkpoint rename map, thereby synchronizing updates to the retire and checkpoint rename maps. Alternatively, the processor may also support dividing its architectural registers into two subsets, where one subset is subject to checkpointing and roll-back, and the other subset is not. In such embodiments, results written to the latter subset of registers are immediately committed upon the successful execution of a modifying instruction. For instance, only some of the native ISA registers (e.g., those expected to be used to hold virtual ISA state) may be subject to the checkpoint, while the other registers commit immediately and are not restored on a roll-back.

In some embodiments, the system can, after committing a previous checkpointed region, switch to a non-checkpointed mode where subsequent instructions commit immediately. In this non-checkpointed mode, the system updates the retire and checkpoint rename maps synchronously, thereby effectively providing functionality substantially similar to that of the commit rename map for a non-checkpointing processor with only two rename maps.

Note that preserving values in physical registers beyond their normal scope may cause severe register contention. By preventing hardware from re-using physical registers that are referenced by the checkpoint rename map, the system preserves values that would otherwise be discarded and facilitates checkpointing, but also prevents register re-use and hence consumes more registers. Note that if a given physical register is not mapped to in the checkpoint rename map, it does not need to be preserved to roll back execution. The number of physical registers needed for a checkpointed region will typically depend on the implementation of the processor pipeline and other hardware and the blend of instructions being checkpointed, but typically needs to be at least equal to or larger than the sum of the number of architectural registers and the number of instructions to be checkpointed. In some embodiments, a compiler translating the guest program to native instructions may analyze the instructions and register use for a program to determine where to insert checkpoints.

In some embodiments, the described techniques can be used for a number of different applications. For instance, in some embodiments, the described checkpointing techniques can facilitate providing precise exception semantics for a virtual machine. Combining the described checkpointing techniques with a software virtual machine may facilitate using fewer physical registers than might otherwise be needed (e.g., less than two times the number of architectural registers), and allow the virtual machine's dynamic compiler to insert checkpoint instructions. For instance, the described checkpointing techniques (when the needed hardware capabilities are available) may be used in conjunction with the above-described safepointing techniques, with the virtual machine perhaps maintaining safepoint maps at the checkpoint locations. Note, however, that checkpointing techniques that use register rename maps can also provide more generally-useful capabilities that are not limited to virtual machines. For example, the described checkpointing techniques can be used to support and/or provide some aspects of transactional memory capabilities, or in other situations that involve speculatively-optimized program code and/or a need to roll back an executing block of program code to a previous checkpoint.

Note that some of the described embodiments facilitate checkpointing and recovery techniques that facilitate providing precise exception semantics for virtual machines while reducing hardware and software overhead and complexity. Using register rename maps for checkpointing involves lower overhead than techniques that copy entire sets of registers to store and recover checkpoints. Copying full registers involves substantial additional overhead, both in copying all of the bits of the values in the registers as well as in adding additional access ports and propagation delay to multi-ported register files, which are typically in the critical path of processors. In contrast, register rename maps are smaller, with the number of bits needed for each "register pointer" (entry) being proportional to the logarithm of the number of physical registers in the native hardware instead of the size of each physical register. Hence, fewer bits need to be copied between the rename maps, and no additional ports need to be added to the register files. Note that for many typical operations, a processor using register rename maps for out-of-order execution does not need to copy values in registers, but instead can simply change mappings of architectural registers to physical registers to point to new and/or different physical registers. Such operations are fast, and involve substantially less hardware cost and complexity than performing bulk copies for entire sets of registers.

Note also that the described techniques do not require twice as many physical registers as architectural registers. However, if the ratio of physical registers to architectural registers is small, there is an increased likelihood that some executing code sequences may deadlock due to an absence of free physical registers (e.g., too many physical registers have been allocated to holding checkpointed and working state). In such situations, the hardware may need to generate an exception, roll back execution state to the previous checkpoint, and then use alternative software techniques to modify and/or re-execute the problematic code region. In a system virtual machine application, a translating compiler/optimizer can be configured to only generate code which complies with the specific resource limitations of the underlying hardware. Note that, except for this limitation on the number of architectural registers which are modified within a speculative (checkpointed) region, there is no limit to the length of the checkpointed region.

In summary, embodiments of the present invention extend and enhance aspects of out-of-order processors to facilitate providing precise exception semantics for a virtual machine. The described system preserves values from retired instructions in available physical registers. The system includes an additional rename map, the checkpoint rename map, which maps architectural registers to physical registers that preserve the precise native state of the guest program for a preceding checkpoint. When the system encounters an exception, it can roll back execution to this preceding checkpoint, after which it can use alternate execution techniques to re-execute problematic portions of the guest program with precise exception semantics. The described techniques provide a minimal set of restrictions on the code which can be executed, and are amenable to use by a system virtual machine.

4. Facilitating Gated Stores without Data Bypass

As described previously, gated stores facilitate providing precise exception semantics for virtual machines by allowing the described systems to speculatively execute multiple stores without committing the stored values or exposing the stored values to other strands (e.g., other threads and/or processes) or devices in the system. However, sometimes issues can arise when a load within an uncommitted block of code attempts to read from a memory location which was previously written by a store instruction in the same uncommitted block of code. For non-gated store buffers, the system can delay executing the load instruction until the stored value has drained from the store buffer and reached the memory system. However, for gated store buffers, delaying the load instruction prevents the block of code from committing, and hence results in deadlock.

An alternative technique allocates additional hardware in the gated store buffer for a store bypass mechanism that allows stored values to be retrieved from the gated store buffer before they are committed and written to the memory system. Unfortunately, while such a store bypass mechanism allows some loads to proceed without stalling, this additional functionality can involve substantial additional hardware cost and complexity. For instance, the store bypass mechanism needs to track the addresses of pending stores in the gated store buffer and, every time an additional load instruction enters the processor pipeline, compare whether the address of the load instruction matches an address already stored in the gated store buffer. Because such comparisons need to occur in parallel for each slot in the gated store buffer, the store bypass mechanism may need to include a substantial number of comparators that can operate in parallel. Furthermore, ensuring that values stored at any location in the gated store buffer have a path back to the processor pipeline involves even greater hardware complexity and cost. For example, register files in the gated store buffer may need to include an additional port for each possible data value in the gated store buffer that might flow back to the processor pipeline in a given cycle, with each additional port for a register incurring substantial hardware cost and complexity. Note that even if the preceding requirements are met, a store bypass mechanism that supports partially overlapping reads and writes may involve even more hardware complexity. For instance, handling a load instruction that loads a data word (four bytes) that partially overlaps with a preceding store instruction that stored a two byte value in the gated store buffer (e.g., essentially loading two bytes from memory and combining them with two bytes forwarded from the gated store buffer) can involve even more complexity. In general, such storage bypass mechanisms need to support a large number of special cases, and hence incur a substantial design and implementation cost.

Figure 10A:
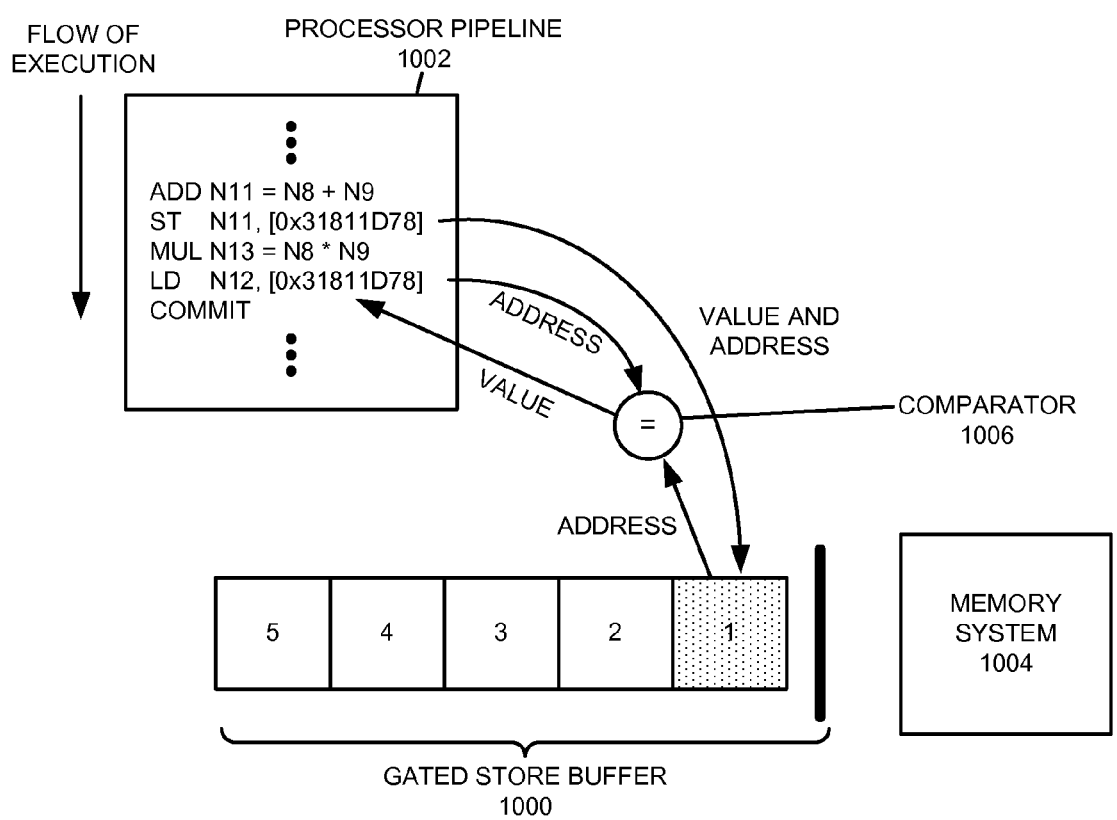
FIG. 10A illustrates the forwarding of a value in a gated store buffer using a store bypass mechanism in accordance with an embodiment of the present invention.

FIG. 10A illustrates forwarding a value in gated store buffer 1000 using a store bypass mechanism. During execution, a store instruction in processor pipeline 1002 stores a value to a memory address. Because this store instruction is in a speculatively-optimized block of code, the gate of gated store buffer 1000 is closed, thereby delaying the write to memory system 1004. The address and the stored value are temporarily stored in gated store buffer 1000. When a subsequent load instruction accesses the same memory address as the preceding store instruction, a comparator 1006 in the store bypass mechanism compares the addresses for the stored value and load instruction, and if the two memory addresses match, forwards the value from the matching slot in gated store buffer 1000 to where it is needed in processor pipeline 1002. Note that typically each slot in gated store buffer 1000 will need a separate comparator (not shown), so that the addresses for all of the stored values in gated store buffer 1000 can be compared to the current instruction's address in parallel.

Figure 10B:
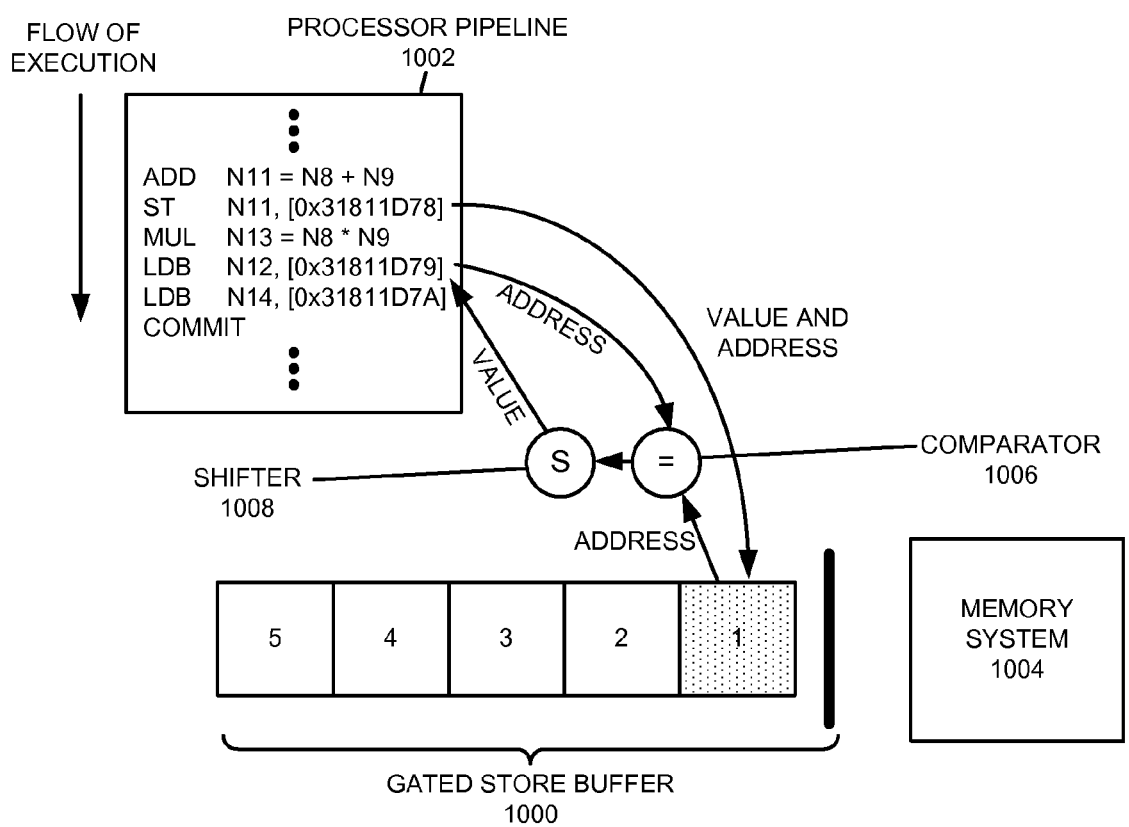
FIG. 10B illustrates the forwarding of an unaligned value using a store bypass mechanism in accordance with an embodiment of the present invention.

FIG. 10B illustrates forwarding an unaligned value using a store bypass mechanism. The store instruction illustrated in FIG. 10B results in a four-byte value being stored in the gated store buffer. Two subsequent load instructions (LDB) load data from the same memory region written by the store, with each of the load instructions respectively loading one byte of this stored value. Successfully forwarding the correct byte values to processor pipeline 1002 may involve a more complex comparison and additional shift and masking operations. For example, in FIG. 10B, comparator 1006 needs to determine if the byte address is present in any of the slots of gated store buffer 1000, and, if the value stored is in a different format (e.g., one byte in a stored word), use shifter 1008 and/or other hardware to format the value returned into the specified format. Note that, depending on the blend of instructions, a "complete" store bypass mechanism that can handle all possible forwarding requests may involve substantial overhead. For instance, if four store instructions write single bytes for four successive byte memory addresses into gated store buffer 1000, and a subsequent load attempts to load the same four bytes as a word, the store bypass mechanism would need to include hardware to shift the four values, merge them into one word, and then forward the resulting value to processor pipeline 1002. Another similar scenario would involve combining and forwarding values for two stores that partially overlap (e.g., if the program instructions write a word to a memory address, subsequently write another single byte value for the same memory address, and then attempt to load a data word that overlaps with both stored values from the memory address). Finally, a complete store bypass mechanism would also need to detect multiple writes to the same memory address, and be able to forward the most recently written value for that memory address. In summary, implementing a complete store bypass mechanism for even a single-issue processor involves substantial complexity, while multiple-issue processors present even more issues and additional forwarding complexity.

In some embodiments of the present invention, the system facilitates allowing gated stores and speculative execution in a virtual machine without requiring a store bypass mechanism. During execution, the system performs the comparisons needed to detect a read-after-write (RAW) to the same memory address within a speculatively-executed block of program code by comparing the addresses of stores in the gated store buffer to those of subsequent loads. However, instead of forwarding data from the gated store buffer to the processor pipeline when a RAW is detected, the system instead signals an exception. The virtual machine's runtime system is configured to respond to this exception by rolling back execution to the previous checkpoint and/or safepoint, at which point the system can re-execute the speculatively-optimized block of code in an un- or less-optimized manner that does not require forwarding values stored in the store bypass mechanism. Note that such techniques may be applied whether the virtual machine uses safepoints and/or checkpoints to revert to a previous point in the guest program.

Figure 11:
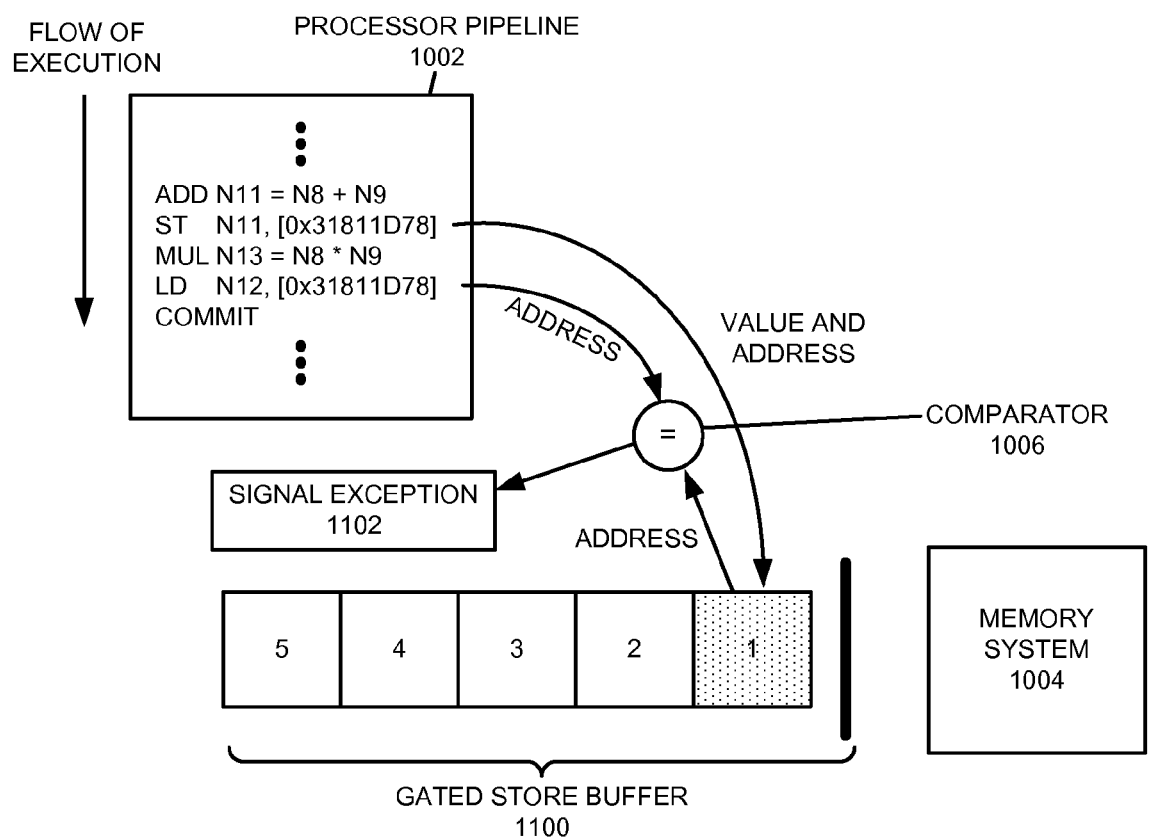
FIG. 11 illustrates a gated store buffer that signals an exception when a subsequent load instruction accesses the same memory address written by a preceding, uncommitted store instruction in accordance with an embodiment of the present invention.

FIG. 11 illustrates a gated store buffer 1100 that signals an exception 1102 when a subsequent load instruction accesses the same memory address written by a preceding, uncommitted store instruction. Gated store buffer 1100 does not include a data bypass mechanism. As in the previous illustrations, comparator 1006 compares the memory addresses for the stored value and load instruction, but if the two memory addresses match, gated store buffer 1100 signals an exception 1102 instead of forwarding the value back from the gated store buffer 1100 to processor pipeline 1002.

Figure 12:
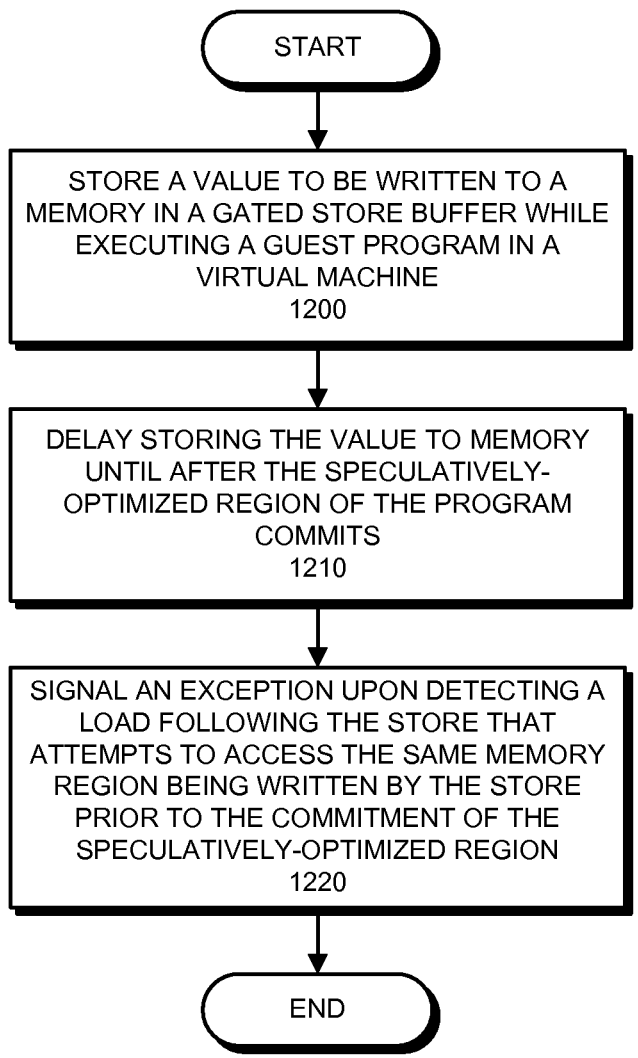
FIG. 12 presents a flow chart illustrating the process of facilitating precise exception semantics in a processor that includes a gated store buffer without a data bypass mechanism in accordance with an embodiment of the present invention.

FIG. 12 presents a flow chart illustrating the process of facilitating precise exception semantics in a processor that includes a gated store buffer without a data bypass mechanism. While executing in a virtual machine on the processor, a guest program executing a speculatively-optimized block of program code executes a store instruction that attempts to write a value to memory (operation 1200). The gated store buffer delays storing the value to memory until after the speculatively-optimized region of the guest program commits (operation 1210). Comparison hardware associated with the gated store buffer compares the memory addresses for subsequent load instructions with the memory addresses stored in the gated store buffer. The gated store buffer signals an exception when it detects a subsequent load that attempts to access the same memory region being written by the store before the speculatively-optimized region has committed (operation 1220).

In some embodiments, the system responds to the exception by re-executing portions of the guest program code as interpreted instructions. By using interpreted instructions that can commit immediately, the system essentially executes with the gate of the gated store buffer open, thereby eliminating the need to forward values from the gated store buffer. Alternatively, the system can also insert another checkpoint and/or safepoint into the program code after the store instruction, to ensure that the stored value is flushed from the gated store buffer prior to the subsequent load instruction.

In some embodiments, the optimizing compiler, while translating the guest program into speculative regions of native code, may attempt to reduce overhead by reducing the number of exceptions triggered by potential RAW cases both in advance (e.g., by using alias analysis) and/or after the fact (e.g., by using profiling statistics). As described above, if the optimizing compiler encounters a load following a store to the same (or potentially the same) address within a speculative block of instructions, it can insert an additional checkpoint (or safepoint) to open the store buffer's gate between the two instructions. Alternatively, the optimizing compiler can also bypass the stored value directly to the consuming load in software. For instance, by extending the scope in which the stored value is preserved in a register, the optimizing compiler can eliminate the need for the load instruction completely. Note, however, that this technique may only work for scenarios where the optimizing compiler can ensure that the load address is the same as the store address, which may involve substantial additional overhead. For instance, the compiler may need to insert explicit address comparison checks for indirect loads, where the address being loaded from is not known until runtime, to determine if a load accesses a stored value in the gated store buffer. To avoid such additional overhead, the optimizing compiler can reduce the number of exceptions where possible, and then catch any remaining RAW situations by signaling an exception and rolling back execution of the guest program to the previous checkpoint (or safepoint).

In some embodiments, the system can distinguish between stored values which are behind the closed gate of a gated store buffer and stored values which have been released but have not yet drained from the store buffer. For instance, the system may signal an exception for the former case, but delay subsequent aliased loads in the latter case.

In some embodiments, the gated store buffer detects RAW cases conservatively. For example, to simplify the comparators, the gated store buffer may compare only a subset of the physical address bits in question. This technique preserves correctness, but may cause unnecessary exceptions to be signaled. Alternatively, the gated store buffer may include alternative alias-detection mechanisms to track stored addresses (e.g., a Bloom filter) to reduce the number of false-positive exceptions that are signaled. For instance, the memory address for each successive store could be entered into a Bloom filter when the stored value enters the store buffer, and then each subsequent load would use the Bloom filter to determine whether its associated address had an address in the gated store buffer. In this example, the Bloom filter would be cleared whenever the system opened the gate of the gated store buffer.

In some embodiments, the gated store buffer includes some (limited) bypass hardware that can be used in some simple scenarios as an alternative to signaling an exception. For instance, the gated store buffer might be configured to forward a stored value only if the subsequent load accesses exactly the same aligned memory address as a stored four-byte value, and loads the entire stored value. Such a hybrid case optimizes simple forwarding situations while signaling an exception for complex situations that would involve dramatically more hardware complexity and/or cost.

In summary, embodiments of the present invention include a gated store buffer that does not incur the complexity and cost of a hardware store buffer bypass mechanism. This gated store buffer detects when values stored by uncommitted store instructions are accessed by subsequent load instructions, and facilitates handling such situations in software by signaling an exception. The described gated store buffer facilitates rolling back program execution to earlier checkpoints (and/or safepoints), thereby facilitating precise exception semantics while reducing hardware overhead.

5. Computing Environment

In some embodiments of the present invention, the described system can be incorporated into and/or accessed by a wide range of computing devices in a computing environment. For instance, a virtual machine with precise exception semantics may be implemented on a range of computing devices, and guest programs may be transferred between such computing devices.

Figure 13:
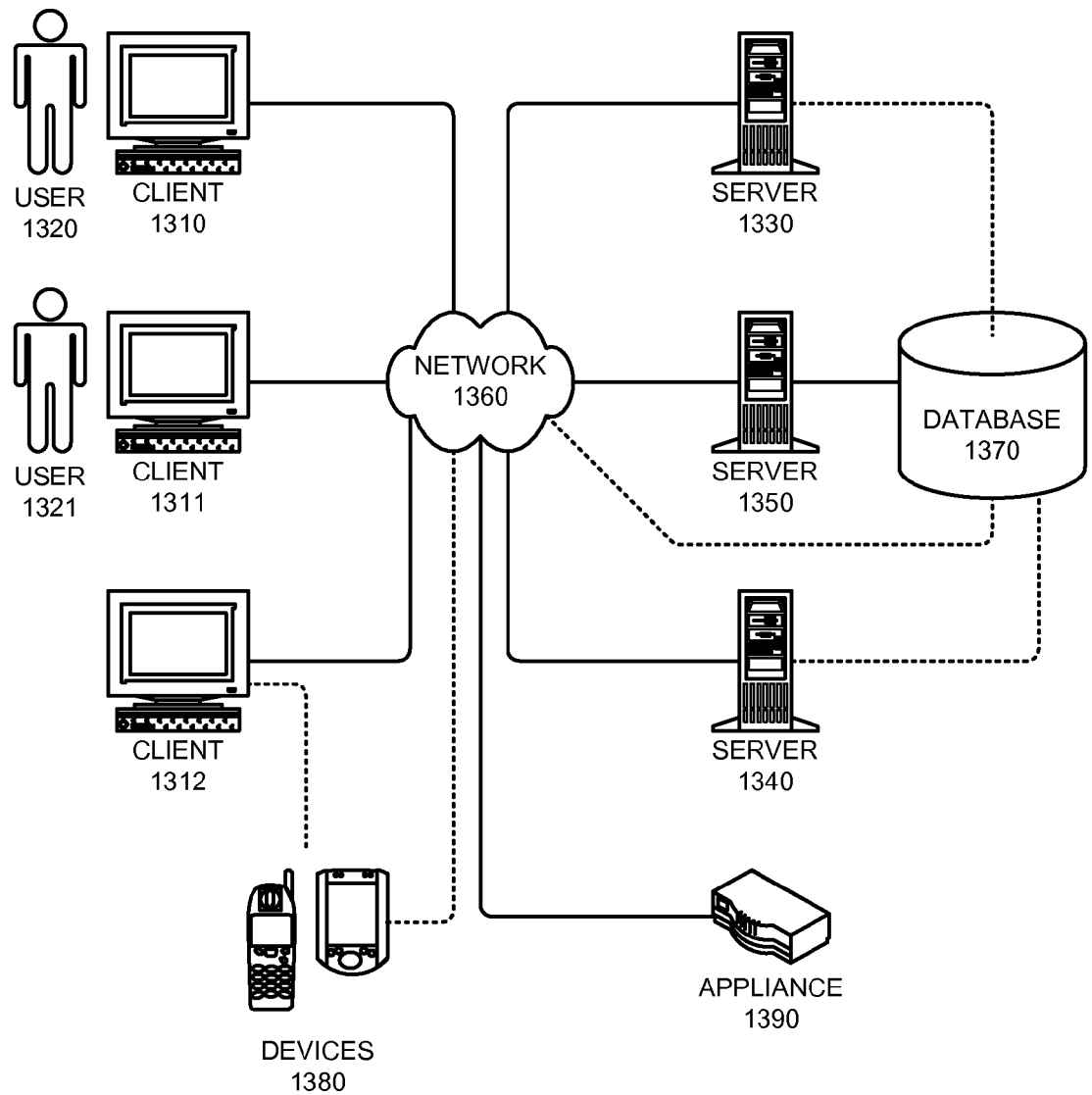
FIG. 13 illustrates a computing environment in accordance with an embodiment of the present invention.

FIG. 13 illustrates a computing environment 1300 in accordance with an embodiment of the present invention. Computing environment 1300 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 13, computing environment 1300 includes clients 1310-1312, users 1320 and 1321, servers 1330-1350, network 1360, database 1370, devices 1380, and appliance 1390.

Clients 1310-1312 can include any node on a network including computational capability and including a mechanism for communicating across the network. Additionally, clients 1310-1312 may comprise a tier in an n-tier application architecture, wherein clients 1310-1312 perform as servers (servicing requests from lower tiers or users), and wherein clients 1310-1312 perform as clients (forwarding the requests to a higher tier).

Similarly, servers 1330-1350 can generally include any node on a network including a mechanism for servicing requests from a client for computational and/or data storage resources. Servers 1330-1350 can participate in an advanced computing cluster, or can act as stand-alone servers. In one embodiment of the present invention, server 1340 is an online "hot spare" of server 1350.

Users 1320 and 1321 can include: an individual; a group of individuals; an organization; a group of organizations; a computing system; a group of computing systems; or any other entity that can interact with computing environment 1300.

Network 1360 can include any type of wired or wireless communication channel capable of coupling together computing nodes. This includes, but is not limited to, a local area network, a wide area network, or a combination of networks. In one embodiment of the present invention, network 1360 includes the Internet. In some embodiments of the present invention, network 1360 includes phone and cellular phone networks.

Database 1370 can include any type of system for storing data in non-volatile storage. This includes, but is not limited to, systems based upon magnetic, optical, or magneto-optical storage devices, as well as storage devices based on flash memory and/or battery-backed up memory. Note that database 1370 can be coupled: to a server (such as server 1350), to a client, or directly to a network. In some embodiments of the present invention, database 1370 is used to store information related to virtual machines and/or guest programs. Alternatively, other entities in computing environment 1300 may also store such data (e.g., servers 1330-1350).

Devices 1380 can include any type of electronic device that can be coupled to a client, such as client 1312. This includes, but is not limited to, cell phones, personal digital assistants (PDAs), smart-phones, personal music players (such as MP3 players), gaming systems, digital cameras, portable storage media, or any other device that can be coupled to the client. Note that in some embodiments of the present invention, devices 1380 can be coupled directly to network 1360 and can function in the same manner as clients 1310-1312.

Appliance 1390 can include any type of appliance that can be coupled to network 1360. This includes, but is not limited to, routers, switches, load balancers, network accelerators, and specialty processors. Appliance 1390 may act as a gateway, a proxy, or a translator between server 1340 and network 1360.

Note that different embodiments of the present invention may use different system configurations, and are not limited to the system configuration illustrated in computing environment 1300. In general, any device that is capable of receiving a guest program and/or executing a guest program in a virtual machine may incorporate elements of the present invention.

Figure 14:
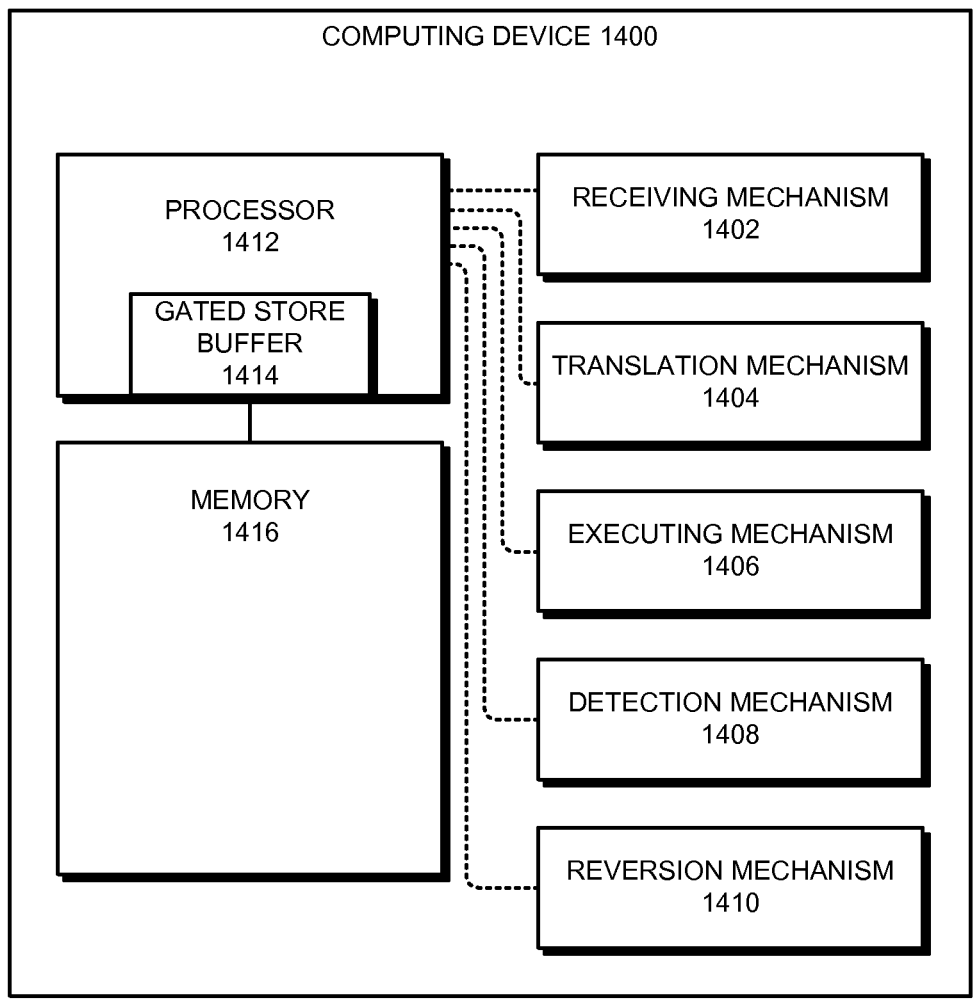
FIG. 14 illustrates a computing device that provides precise exception semantics for a virtual machine in accordance with an embodiment of the present invention.

FIG. 14 illustrates a computing device 1400 that provides precise exception semantics for a virtual machine in accordance with an embodiment of the present invention. Computing device 1400 includes receiving mechanism 1402, translation mechanism 1404, executing mechanism 1406, detection mechanism 1408, reversion mechanism 1410, processor 1412, and memory 1416. Processor 1412 includes gated store buffer 1414. During operation, receiving mechanism 1402 receives a guest program that contains instructions specified in the ISA of a virtual machine. Translation mechanism 1404 translates these instructions into native instructions for computing device 1400, in the process inserting one or more checkpoints and/or safepoints into the translated native instructions. Next, executing mechanism 1406 executes the native instructions. Detection mechanism 1408 detects any exceptions triggered by these native instructions, and prompts reversion mechanism 1410 to revert program execution to a previous checkpoint and/or safepoint to ensure that the virtual machine precisely emulates the exception behavior of the virtual machine's ISA.

Note that many of the techniques described in the previous sections can be used either in conjunction with one another or separately. For instance, the described safepointing and checkpointing techniques may both be used simultaneously to provide precise exception semantics on an out-of-order processor that supports three register rename maps and a gated store buffer without data bypass. Alternatively, the safepointing and checkpointing techniques may be used separately, either with a different type of gated store buffer or some other hardware or software mechanism that facilitates undoing speculative stores. In one exemplary system that combines two or more of the described techniques: 1) software-only safepointing techniques are used to recover precise virtual processor state (and does not recover native state); 2) a hardware gated store buffer allows speculative stores to be rolled back (e.g., perhaps using an extra instruction that is inserted by a compiler to control the gated store buffer's gate); and 3) processor hardware (e.g., three register rename maps) are used to checkpoint and recover precise native state.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computing device that facilitates providing precise exception semantics for a virtual machine, wherein the computing device comprises a processor configured to:

receive native instructions for a program, wherein the native instructions correspond to a native instruction set architecture (ISA) for a processor and correspond to virtual instructions for a virtual ISA that is different from the native ISA;

receive a store instruction in the native instructions that writes a value to a memory;

delay writing the value to the memory until after a speculatively-optimized region of the program commits by writing the value to a gated store buffer;

determine whether a load instruction in the native instructions that follows the store instruction attempts to access, prior to the speculatively-optimized region committing, a memory address that is aligned with a byte-width of the value, the memory address in a region of the memory accessed by the store instruction;

when the load instruction attempts to access a memory address that is not aligned with the byte-width, roll back execution of the program to a preceding point in the program by signaling an exception, wherein, while rolling back the execution, the processor is configured to use a virtual machine to re-execute the speculatively-optimized region by using the virtual machine to execute instructions in the virtual instructions that correspond to native instructions in the speculatively-optimized region; and otherwise, when the load instruction attempts to access a memory address that is aligned with the byte-width, use a bypass mechanism for the gated store buffer to provide the value to the load instruction instead of performing the rolling back.

2. The computing device of claim 1, wherein, upon determining that the gated store buffer has detected that a load following the store is attempting to access a same memory region being written by the store prior to the commitment of the speculatively-optimized region, the processor is configured to flush contents of the gated store buffer.

3. The computing device of claim 1, wherein rolling back program execution to the preceding point in the program involves:
    restoring a virtual state associated with a preceding safepoint; and
    restoring a state associated with a preceding checkpoint.

4. The computing device of claim 1, wherein signaling the exception facilitates avoiding deadlock without needing to include bypass hardware in the processor that retrieves one or more values from the gated store buffer for the load.

5. The computing device of claim 2, wherein after signaling the exception, the processor, an operating system for the processor, an optimizing compiler, and/or the virtual machine are further configured to:
    add an additional safepoint or checkpoint after the store but previous to the load to ensure that a value associated with the store is written to memory prior to the load.

6. The computing device of claim 1,
    wherein the gated store buffer includes values for both uncommitted stores and committed stores that have not yet been written to the memory; and
    wherein the processor is further configured to not raise the exception when the load accesses a value associated with a committed but unwritten store.

7. The computing device of claim 1, wherein the gated store buffer is configured to perform a conservative and/or an alternative comparison between a memory region accessed by the load and a memory region accesses by the store to determine whether the two operations access a same memory region.

8. The computing device of claim 7, wherein the conservative and/or alternative comparison involves one or more of the following:
    comparing a subset of the physical address bits for the memory region accessed by the load and the memory region accessed by the store; and
    using an alternative alias-detection mechanism to determine whether the gated store buffer may contain a value for the memory region being accessed by the load.

9. A method that facilitates providing precise exception semantics for a virtual machine, the method comprising:

receiving native instructions for a program, wherein the native instructions correspond to a native instruction set architecture (ISA) for a processor and correspond to virtual instructions for a virtual ISA that is different from the native ISA;

receiving a store instruction in the native instructions that writes a value to a memory;

delaying writing the value to the memory until after a speculatively-optimized region of the program commits by writing the value to a gated store buffer;

determining whether a load instruction in the native instructions that follows the store instruction attempts to access, prior to the speculatively-optimized region committing, a memory address that is aligned with a byte-width of the value, the memory address in a region of the memory accessed by the store instruction;

when the load instruction attempts to access a memory address that is not aligned with the byte-width, rolling back execution of the program to a preceding point in the program by signaling an exception, wherein the rolling back comprises using a virtual machine to re-execute the speculatively-optimized region by using the virtual machine to execute instructions in the virtual instructions that correspond to native instructions in the speculatively-optimized region; and otherwise, when the load instruction attempts to access a memory address that is aligned with the byte-width, using a bypass mechanism for the gated store buffer to provide the value to the load instruction instead of performing the rolling back.

10. The method of claim 9,
    wherein, upon determining that the gated store buffer has detected that a load following the store is attempting to access a same memory region being written by the store prior to the commitment of the speculatively-optimized region, the method further comprises flushing contents of the gated store buffer.

11. The method of claim 10, wherein, after signaling the exception, the method further comprises:
    adding an additional safepoint or checkpoint after the store but previous to the load to ensure that a value associated with the store is written to memory prior to the load.

12. The method of claim 9, wherein rolling back program execution to the preceding point in the program involves one or more of the following:
    restoring a virtual state associated with a preceding safepoint; and
    restoring a state associated with a preceding checkpoint.

13. The method of claim 9, wherein signaling the exception facilitates avoiding deadlock without needing to include bypass hardware in a processor to retrieve one or more values from the gated store buffer for the load.

14. The method of claim 9, wherein the method further involves performing a conservative and/or an alternative comparison between a memory region accessed by the load and a memory region accessed by the store to determine whether the two operations access a same memory region.

15. The method of claim 14, wherein the conservative and/or alternative comparison involves one or more of the following:
    comparing a subset of the physical address bits for the memory region accessed by the load and the memory region accessed by the store; and
    using an alternative alias-detection mechanism to determine whether the gated store buffer may contain a value for the memory region being accessed by the load.

16. The method of claim 9, wherein the determining that the load attempts to access the region involves performing an operation, and wherein the method further comprises, upon receiving a non-checkpoint instruction for the program while executing the program, committing a result for a subsequent instruction to memory without preforming the operation for the subsequent instruction.

17. The method of claim 9, further comprising:

receiving the virtual instructions;

translating the virtual instructions into the native instructions; and while executing the native instructions on the processor, storing values to be written to memory in a gated store buffer, wherein the speculatively-optimized region of the program comprises the store instruction, wherein the store instruction writes to a memory address in the region of memory, wherein the load instruction executes after the store instruction executes, wherein the rolling back the execution occurs in response to receiving the exception and does not comprise forwarding the value from the gated store buffer to the load instruction, and wherein the value is not forwarded from the gated store buffer to the load instruction during the execution of the program.

18. The method of claim 9, wherein the gated store buffer includes values for both uncommitted stores and committed stores that have not yet been written to the memory; and wherein the processor is further configured to not raise the exception when the load accesses a value associated with a committed but unwritten store.

19. A non-transitory computer-readable storage medium storing instructions that when executed by a computer cause the computer to perform a method that facilitates providing precise exception semantics for a virtual machine, the method comprising:

receiving native instructions for a program, wherein the native instructions correspond to a native instruction set architecture (ISA) for a processor and correspond to virtual instructions for a virtual ISA that is different from the native ISA;

receiving a store instruction in the native instructions that writes a value to a memory;

delaying writing the value to the memory until after a speculatively-optimized region of the program commits by writing the value to a gated store buffer;

determining whether a load instruction in the native instructions that follows the store instruction attempts to access, prior to the speculatively-optimized region committing, a memory address that is aligned with a byte-width of the value, the memory address in a region of the memory accessed by the store instruction;

when the load instruction attempts to access a memory address that is not aligned with the byte-width, rolling back execution of the program to a preceding point in the program by signaling an exception, wherein rolling back the execution comprises using a virtual machine to re-execute the speculatively-optimized region by using the virtual machine to execute instructions in the virtual instructions that correspond to native instructions in the speculatively-optimized region; and otherwise, when the load instruction attempts to access a memory address that is aligned with the byte-width, using a bypass mechanism for the gated store buffer to provide the value to the load instruction instead of performing the rolling back.

20. The non-transitory computer-readable storage medium of claim 19, wherein the method further involves:

flushing the contents of the gated store buffer and rolling back program execution to a preceding point in the program; and wherein rolling back program execution to the preceding point facilitates ensuring precise exception semantics for the virtual machine.

* * * * *

UNITED STATES PATENT AND TRADEMARK OFFICE
CERTIFICATE OF CORRECTION

PATENT NO. : 8,959,277 B2  
APPLICATION NO. : 12/334316  
DATED : February 17, 2015  
INVENTOR(S) : Vick et al.

Page 1 of 1

It is certified that error appears in the above-identified patent and that said Letters Patent is hereby corrected as shown below:

On the title page item (56), column 2, under Other Publications, line 10, delete "Compatable" and insert -- Compatible --, therefor.

Signed and Sealed this
Twenty-second Day of March, 2016

Michelle K. Lee
*Director of the United States Patent and Trademark Office*